(12) United States Patent
Adams et al.

(10) Patent No.: US 12,161,966 B1
(45) Date of Patent: Dec. 10, 2024

(54) SYSTEM AND METHOD FOR SEGREGATING COMPONENT GASES FROM ATMOSPHERIC AIR

(71) Applicants: Sam Adams, Henderson, NV (US); Fernando V Sanchez, Tampa, FL (US)

(72) Inventors: Sam Adams, Henderson, NV (US); Fernando V Sanchez, Tampa, FL (US)

(73) Assignees: Sam Adams, Henderson, NV (US); Fernando V Sanchez, Tampa, FL (US)

( * ) Notice: Subject to any disclaimer, the term of this patent is extended or adjusted under 35 U.S.C. 154(b) by 0 days.

(21) Appl. No.: 18/796,434

(22) Filed: Aug. 7, 2024

Related U.S. Application Data

(60) Provisional application No. 63/631,055, filed on Apr. 8, 2024, provisional application No. 63/631,078, filed on Apr. 8, 2024, provisional application No. 63/518,109, filed on Aug. 8, 2023.

(51) Int. Cl.
*B01D 53/04* (2006.01)
*B01D 53/62* (2006.01)

(52) U.S. Cl.
CPC ..... *B01D 53/0446* (2013.01); *B01D 53/0454* (2013.01); *B01D 2253/108* (2013.01); *B01D 2253/204* (2013.01); *B01D 2253/25* (2013.01); *B01D 2257/402* (2013.01); *B01D 2257/504* (2013.01); *B01D 2257/7025* (2013.01); *B01D 2258/06* (2013.01); *B01D 2259/40083* (2013.01)

(58) Field of Classification Search
CPC ............................ B01D 53/04; B01D 53/0446; B01D 53/0454; B01D 53/047; B01D 2253/108; B01D 2253/204; B01D 2253/25; B01D 2257/402; B01D 2257/504; B01D 2257/7025; B01D 2258/06; B01D 2259/40083
USPC ........................ 96/109–117; 95/1, 8–23, 139
See application file for complete search history.

(56) References Cited

U.S. PATENT DOCUMENTS

| 7,634,417 | B2 * | 12/2009 | Boyden | G06Q 40/00 422/177 |
|---|---|---|---|---|
| 2013/0061747 | A1 * | 3/2013 | Turnbull | B01D 53/0454 96/111 |
| 2020/0206675 | A1 * | 7/2020 | Kim | F24F 8/80 |
| 2022/0003440 | A1 * | 1/2022 | Choi | B03C 3/12 |
| 2022/0355237 | A1 * | 11/2022 | Thomas | G01N 33/0075 |
| 2022/0355238 | A1 * | 11/2022 | Lackner | B01D 53/0407 |

(Continued)

*Primary Examiner* — Frank M Lawrence, Jr.
(74) *Attorney, Agent, or Firm* — Jason C. Cameron

(57) ABSTRACT

A system and a method for segregating one or more component gases from atmospheric air are disclosed. The system comprises one or more segregation units, one or more sensors, one or more hardware processors, and a memory unit. Each segregation unit of the one or more segregation units comprises at least one of: an enclosure, one or more adsorptive composites, one or more airflow-controlling units, and a gas-sealed flap. The one or more adsorptive composites is operatively positioned in the enclosure to adsorb the one or more component gases from the atmospheric air during the processing of the atmospheric air as the atmospheric air interacts with the one or more adsorptive composites. The system employs one or more artificial intelligence models and one or more predictive artificial intelligence models to optimize the one or more operational parameters of the one or more segregation units.

20 Claims, 8 Drawing Sheets

(56) References Cited

U.S. PATENT DOCUMENTS

2023/0145092 A1* 5/2023 Yang ..................... H04W 72/23
2024/0001278 A1* 1/2024 Mou ...................... B01D 53/72

* cited by examiner

SYSTEM AND METHOD FOR SEGREGATING COMPONENT GASES FROM ATMOSPHERIC AIR

CROSS REFERENCE TO RELATED APPLICATION(S)

This application claims the priority to and incorporates by reference the entire disclosure of U.S. provisional patent application bearing No. 63/518,109 filed on Aug. 7, 2023; US Provisional patent application bearing No. 63/631,055 filed on Apr. 8, 2024 and US Provisional patent application bearing No. 63/631,078 filed on Apr. 8, 2024.

TECHNICAL FIELD

Embodiments of the present disclosure relate to atmospheric gas separation and more particularly relate to a system and a method for segregating one or more component gases from atmospheric air.

BACKGROUND

Atmospheric air comprises various gases, including nitrogen, oxygen, carbon dioxide, and trace amounts of other gases. Separating and concentrating specific gases from the atmospheric air has numerous applications in industrial processes, environmental management, and scientific research. Traditional methods for gas separation often involve solvent and/or energy-intensive processes such as one of a: cryogenic distillation, pressure swing adsorption, and membrane separation.

Conventional techniques typically require large-scale infrastructure, significant energy input, and often operate at one of: high pressures, extreme temperatures, specific geology, and specific sources. As a result, they are costly to implement, operate and maintain, limiting the conventional technique's widespread adoption and application in diverse settings. Additionally, many existing gas separation technologies struggle to achieve high levels of efficacy, efficiency and selectivity, particularly when dealing with gases present in low concentrations in the atmosphere.

Growing concern over climate change and a need for carbon dioxide management has intensified a search for more efficient and cost-effective methods of atmospheric gas separation. There is a particular interest in developing technologies that operate in ambient conditions and with lower energy requirements and at much lower costs that current capabilities. Such advancements potentially enable more distributed and flexible gas separation systems, opening up new possibilities for carbon capture, air purification, and industrial gas production.

Adsorption-based gas separation has emerged as a promising approach due to its potential for lower energy consumption and operational simplicity. However, the development of highly selective and efficient adsorbent materials remains a significant challenge.

There are various technical problems with the atmospheric gas separation in the prior art. In the existing technology, conventional methods often struggle with efficiency and selectivity. The cryogenic distillation, while effective for large-scale operations, is energy-intensive and costly for smaller applications. Pressure swing adsorption systems face challenges in achieving high purity levels for certain gas mixtures. The membrane separation technologies, though promising, still grapple with issues of durability and selectivity for complex gas compositions. Additionally, current methods often require significant infrastructure and are not easily scalable or adaptable to varying input gas compositions. These limitations result in increased operational costs, reduced output quality, and restricted applicability across different industrial sectors. Furthermore, the environmental impact of some existing separation processes, particularly those with high energy demands, raises concerns in an increasingly carbon-conscious global market.

Moreover, existing systems typically lack intelligent control mechanisms that could optimize performance across different operational scenarios. The integration of artificial intelligence and machine learning in gas separation processes remains largely unexplored, despite its potential to significantly enhance efficiency and adaptability.

Therefore, there is a need for a system to address the aforementioned issues by providing a more efficient, economically significant, and scalable solution for segregating one or more component gases from the atmospheric air. There is also a growing need for modular and distributed gas separation systems that are easily deployed in various settings and integrated with renewable energy sources.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for segregating one or more component gases from atmospheric air is disclosed. The system comprises one or more segregation units, one or more sensors, one or more hardware processors, and a memory unit. Each segregation unit of the one or more segregation units comprises at least one of: an enclosure, one or more adsorptive composites, one or more airflow-controlling units, and a gas-sealed flap.

In an embodiment, the enclosure comprises at least one of: one or more inlet vents and two or more outlet vents. The enclosure is configured to: a) obtain and compress the atmospheric air into the enclosure through the one or more inlet vents for processing the atmospheric air and b) emit processed atmospheric air and the one or more component gases through the two or more outlet vents. The processed atmospheric air is the atmospheric air free from the one or more component gases. The one or more component gases comprise at least one of: carbon dioxide ($CO_2$) methane ($CH_4$), nitrous oxide ($N_2O$) and the like.

In yet another embodiment, the one or more adsorptive composites is operatively positioned in the enclosure. The one or more adsorptive composites is configured to adsorb the one or more component gases from the atmospheric air during the processing of the atmospheric air as the atmospheric air interacts with the one or more adsorptive composites for emitting the processed atmospheric air. The one or more adsorptive composites selected from a group comprises at least one of: amines, Zeolites, and Metal Organic Frameworks (MOFs). The amines comprise at least one of a: tetraethylenepentamine (TEPA), Monoethanolamine (MEA), Diethanolamine (DEA), Diethylenetriamine (DETA), Polyethylenimine (PEI), Methyldiethanolamine (MDEA), and Piperazine (PZI). The one or more adsorptive composites is synthesized by bounding at least one of the: amines, Zeolites, Metal Organic Frameworks (MOFs) with a graphene ink applied to a ceramic substrate. The ceramic substrate is selected from a group of material comprises at least one of: alumina ($Al_2O_3$), Zirconia ($ZrO_2$), Silicon Carbide (SIC), Cordierite ($2MgO·2Al_2O_3·5SiO_2$), Titania ($TiO_2$), Barium Titanate ($BaTiO_3$), Magnesia (MgO), and Hafnia ($HfO_2$). The one or more adsorptive composites is operatively positioned in the enclosure by using one or more perforated containers oriented in one or more configurations. The one or more configurations comprises at least one of a: horizontal stack configuration, vertical stack configuration, angled stack configuration, and waveform surface configuration.

In yet another embodiment, the one or more airflow-controlling units is operatively attached to at least one of the: one or more inlet vents and two or more outlet vents of the enclosure. The one or more airflow-controlling units is configured to at least one of: a) drive the atmospheric air from surroundings into the enclosure towards the one or more adsorptive composites and b) release at least one of the: adsorbed one or more component gases and processed atmospheric air from the enclosure.

In yet another embodiment, the one or more airflow-controlling units comprises at least one of: blowers, fans, ducts, air handling units, and air pumps. At least one of the: blowers, fans, ducts, air handling units, and air pumps is configured to: a) drive the atmospheric air from the surroundings into the enclosure by initiating a first airflow-controlling unit of the one or more airflow-controlling units associated with the one or more inlet vents by the one or more hardware processors based on one or more controlled signals and b) emit the one or more component gases and the processed atmospheric air, from the enclosure by initiating a second airflow-controlling unit of the one or more airflow-controlling units and a third airflow-controlling unit of the one or more airflow-controlling units associated with the two or more outlet vents by the one or more hardware processors based on the one or more controlled signals.

In yet another embodiment, the gas-sealed flap is operatively connected to at least one of the: one or more inlet vents and two or more outlet vents of the enclosure. The gas-sealed flap is configured to one of: seal and unseal at least one of the: one or more inlet vents and two or more outlet vents for at least one of: regulating a flow of the atmospheric air into the enclosure and releasing at least one of the: adsorbed one or more component gases and processed atmospheric air from the enclosure.

In yet another embodiment, the gas-sealed flap is associated with the one or more inlet vents that is closed by the one or more hardware processors to halt the flow of the atmospheric air into the enclosure for releasing the adsorbed one or more component gases based on inducing electrical current into the one or more adsorptive composites. The gas-sealed flap is associated with a first outlet vent of the two or more outlet vents that is opened by the one or more hardware processors based on the one or more controlled signals to emit the adsorbed one or more component gases into diverse gas-storing cylinders. The gas-sealed flap is associated with a second outlet vent of the two or more outlet vents that is opened by the one or more hardware processors based on the one or more controlled signals to emit the processed atmospheric air from the enclosure.

In yet another embodiment, the one or more sensors is operatively connected to the enclosure associated with each segregation unit of the one or more segregation units. The one or more sensors is configured to generate sensor data based on at least one of: one or more environmental conditions and one or more operational parameters. The one or more sensors comprises at least one of: one or more temperature sensors, one or more pressure sensors, one or more humidity sensors, one or more gas concentration sensors, one or more airflow sensors, and one or more particulate matter sensors. The one or more environmental conditions comprises at least one of a: temperature, pressure, humidity, and concentrations of gases. The one or more operational parameters comprises at least one of a: speed of the one or more airflow-controlling units, operational status of the gas-sealed flap, saturation level of the one or more adsorptive composites, and elapsed time for resetting the system.

In yet another embodiment, the one or more hardware processors is operatively connected to the one or more sensors. The memory unit is operatively connected to the one or more hardware processors. The memory unit comprises a set of computer-readable instructions in form of a plurality of subsystems. The plurality of subsystems is configured to be executed by the one or more hardware processors. The plurality of subsystems comprises a data-obtaining subsystem, a data-analysis subsystem, an operational parameters optimization subsystem, and a notification generation subsystem.

In yet another embodiment, the data-obtaining subsystem is configured to obtain the generated sensor data from the one or more sensors. In yet another embodiment, the data-analysis subsystem is configured to generate the one or more controlled signals based on analyzing the obtained sensor data using one or more artificial intelligence models. The one or more controlled signals comprises information related to at least one of: adjusting the speed of the one or more airflow-controlling units, changing the operational status of the gas-sealed flap, initiating the release of the adsorbed one or more component gases, triggering one or more maintenance alerts for the one or more adsorptive composites, and scheduling the elapsed time for resetting the system.

In yet another embodiment, the one or more artificial intelligence models is a Recurrent Neural Network (RNN) model. The RNN model is a long short-term memory (LSTM) network. The RNN model is configured to optimize the one or more operational parameters based on historical data. The data-analysis subsystem uses a reinforcement learning approach to optimize an efficiency of the one or more segregation units across a geographical region.

In yet another embodiment, the operational parameters optimization subsystem is configured to use the one or more controlled signals and one or more predictive artificial intelligence models to optimize the one or more operational parameters for at least one of: actuating the gas-sealed flap associated with at least one of the: one or more inlet vents and two or more outlet vents, and regulating the one or more airflow-controlling units, thereby the one or more adsorptive composites configured to segregate the one or more component gases from the atmospheric air.

In yet another embodiment, the one or more predictive artificial intelligence models is a Reinforcement Learning (RL) model. The RL model comprises at least one of a: Deep Q-Network (DQN) and Policy Gradient method, combined with the RNN model. The RL model is configured to predict one or more saturation rates of the one or more adsorptive composites for optimizing the one or more operational parameters.

In yet another embodiment, the notification generation subsystem is configured to generate the one or more maintenance alerts if the one or more adsorptive composites need at least one of: replacement and maintenance.

In accordance with an embodiment of the present disclosure, a method for segregating the one or more component gases from the atmospheric air is disclosed. In the first step, the method includes obtaining, by the enclosure associated with the one or more inlet vents of each segregation unit of the one or more segregation units, the atmospheric air to process the atmospheric air. In the next step, the method includes processing, by the one or more adsorptive composites in the enclosure, the atmospheric air to adsorb the one or more component gases from the atmospheric air as the atmospheric air interacts with the one or more adsorptive composites to emit the processed atmospheric air. The processed atmospheric air is the atmospheric air free from the one or more component gases.

In the next step, the method includes generating, by the one or more sensors, the sensor data based on at least one of the: one or more environmental conditions and one or more operational parameters. In the next step, the method includes obtaining, by the one or more hardware processors, the generated sensor data from the one or more sensors. In the next step, the method includes analyzing, by the one or more hardware processors, the obtained sensor data using the one or more artificial intelligence models to generate the one or more controlled signals.

In the next step, the method includes optimizing, by the one or more hardware processors, the one or more operational parameters using the one or more controlled signals and the one or more predictive artificial intelligence models for at least one of the: actuating the gas-sealed flap associated with at least one of the: one or more inlet vents and two or more outlet vents associated with the enclosure to regulate the flow of the atmospheric air into the enclosure and release at least one of the: adsorbed one or more component gases and processed atmospheric air from the enclosure, and regulating the one or more airflow-controlling units, thereby the one or more adsorptive composites is configured to segregate the one or more component gases from the atmospheric air.

In accordance with an embodiment of the present disclosure, a non-transitory computer-readable storage medium having programmable instructions stored therein. The programmable instructions are executed by the one or more hardware processors.

The one or more hardware processors is configured to: a) obtain the sensor data from the one or more sensors associated with the one or more segregation units. Each segregation unit of the one or more segregation units comprises the enclosure configured with the one or more adsorptive composites to adsorb the one or more component gases from the atmospheric air as the atmospheric air interacts with the one or more adsorptive composites for emitting the processed atmospheric air. The processed atmospheric air is the atmospheric air free from the one or more component gases. The sensor data is generated based on at least one of the: one or more environmental conditions and one or more operational parameters of at least one of the: one or more adsorptive composites, one or more airflow-controlling units, and gas-sealed flap that is operatively connected to at least one of the: one or more inlet vents and two or more outlet vents of the enclosure, b) analyze the obtained sensor data using the one or more artificial intelligence models to generate the one or more controlled signals, and c) optimize the one or more operational parameters using the one or more controlled signals and the one or more predictive artificial intelligence models for at least one of the: actuating the gas-sealed flap associated with at least one of the: one or more inlet vents and two or more outlet vents associated with the enclosure to regulate the flow of the atmospheric air into the enclosure and release at least one of the: adsorbed one or more component gases and processed atmospheric air from the enclosure, and regulating the one or more airflow-controlling units, thereby the one or more adsorptive composites is configured to segregate the one or more component gases from the atmospheric air.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
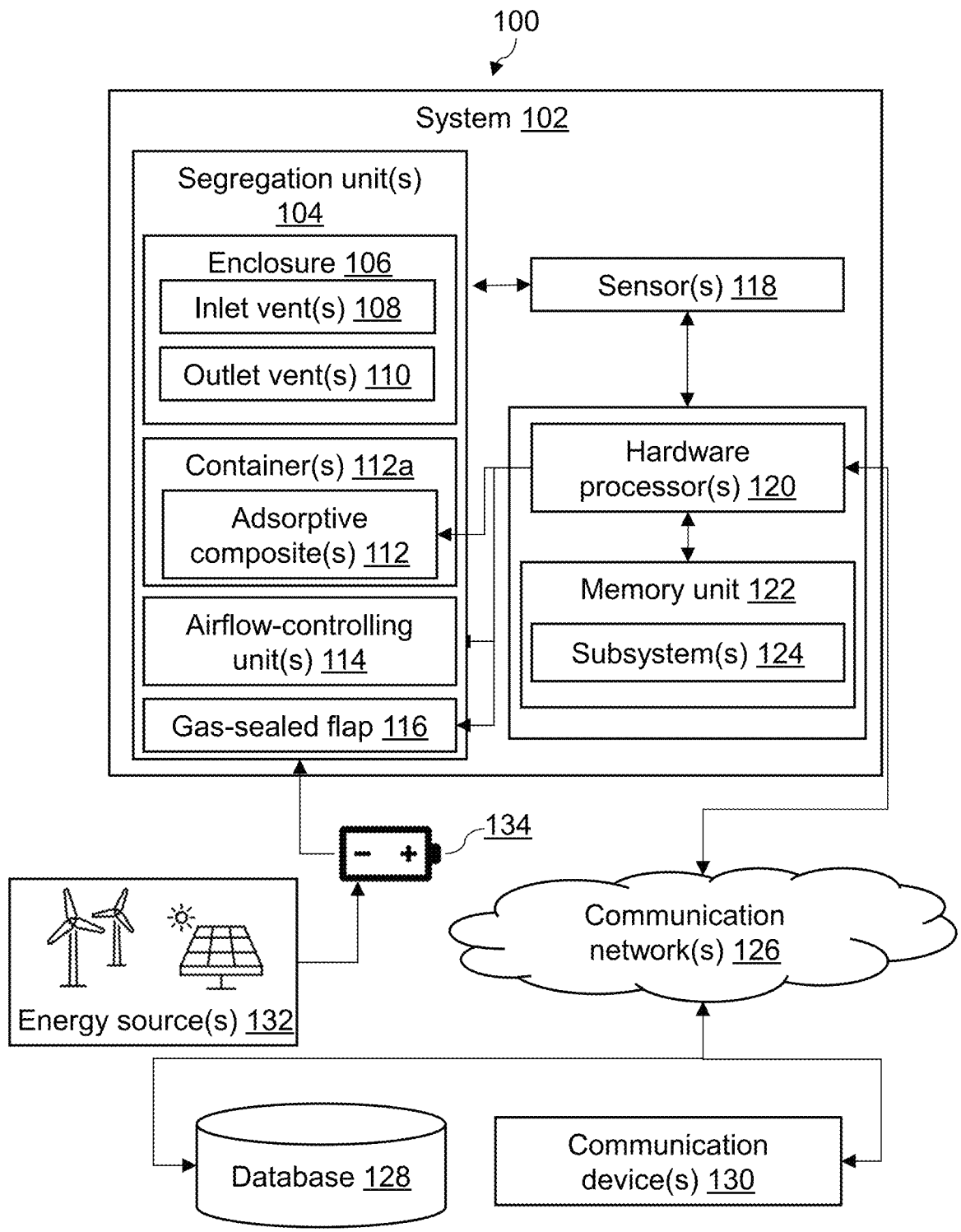
FIG. 1 illustrates an exemplary block diagram representation of a network architecture depicting a system for segregating one or more component gases from atmospheric air, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, cloud, client or server computer system, and hybrid computing environment) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 depicting a system 102 for segregating one or more component gases from atmospheric air, in accordance with an embodiment of the present disclosure.

According to an exemplary embodiment of the present disclosure, the network architecture 100 may include the system 102, one or more communication networks 126, a database 128, and one or more communication devices 130. The system 102 may be communicatively coupled to the database 128, and the one or more communication devices 130 via the one or more communication networks 126. The one or more communication networks 126 may be, but not limited to, a wired communication network and/or a wireless communication network. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including 4G and 5G technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like. The one or more communication networks 126 is configured to transmit one or more maintenance alerts to the one or more communication devices 130 for notifying to one or more users. Further, the one or more communication networks 126 is configured to facilitate seamless data exchange and communication between the system 102, the database 128 for real-time data analysis by at least one of: one or more artificial intelligence models and one or more predictive artificial intelligence models. The database 128 may be any kind of database such as, but not limited to, relational databases, non-relational databases, graph databases, document databases, dedicated databases, dynamic databases, monetized databases, scalable databases, cloud databases, distributed databases, any other databases, and a combination thereof. In another exemplary embodiment, the database 128 may be configured as at least one of: an onsite database, a hybrid database (which incorporates both on-premises and cloud-based components), or a cloud-mirrored database (where the primary database is maintained onsite with real-time synchronization to a cloud-based replica).

In an exemplary embodiment, the database 128 may include, but not limited to, storing, and managing data related to one or more operational parameters, one or more environmental conditions, and performance metrics of the system 102. This data may encompass historical and real-time information about the concentrations of the one or more component gases, one or more status and one or more saturation levels of one or more adsorptive composites 112, flow rates, temperature, pressure, and humidity levels. Additionally, the database 128 may store data related to the operation and performance of at least one of the: one or more artificial intelligence models and one or more predictive artificial intelligence models used by the system 102 to enhance a segregation process of the one or more component gases from the atmospheric air. The database 128 serves as a central repository for all relevant data, enabling efficient data retrieval and analysis to support decision-making processes. The database 128 also facilitates the generation of reports and the one or more alerts for maintenance and operational adjustments, ensuring the system 102 operates at peak efficiency. Furthermore, the database 128 may manage user access controls, configuration settings, and system logs, providing a comprehensive solution for data management and security within the network architecture 100.

In an exemplary embodiment, the one or more communication devices 130 may represent various network endpoints, such as, but not limited to, user devices, mobile devices, smartphones, Personal Digital Assistants (PDAs), tablet computers, phablet computers, wearable computing devices, Virtual Reality/Augmented Reality (VR/AR) devices, laptops, desktops, display interface panels, control panels, human machine interface panels, liquid crystal display (LCD) screens, light-emitting diode (LED) screens, and the like. The one or more communication devices 130 is configured to function as an intermediate unit between the system 102 and the one or more users. The one or more communication devices 130 is equipped with one or more user interfaces that allow the one or more users to interact with the system 102. The one or more user interfaces may include graphical displays, touchscreens, voice recognition, and other input/output mechanisms that facilitate easy access to data and control functions.

Additionally, the one or more communication devices 130 may provide real-time updates and one or more alerts regarding status of the one or more maintenance alerts if the one or more adsorptive composites 112 need at least one of: replacement and maintenance. The one or more communication devices 130 may also display data on the current concentrations of at least one of the: one or more component gases, one or more environmental conditions, and one or more operational parameters. The one or more users may receive notifications via the one or more communication devices 130, enabling them to take timely action based on the system's 102 needs. Additionally, the one or more communication devices 130 may facilitate remote monitoring and control of the system 102, allowing the one or more users to adjust settings, initiate maintenance protocols, and review the historical data to make informed decisions about enhancing the segregation process. This functionality ensures that the system 102 remains responsive and adaptive to changing conditions, enhancing overall operational effectiveness.

In an exemplary embodiment, the system 102 may be implemented by way of a single device or a combination of multiple devices that may be operatively connected or networked together. The system 102 may implemented in hardware or a suitable combination of hardware and software. The system 102 comprises one or more segregation units 104, one or more sensors 118, one or more hardware processors 120, and a memory unit 122. Each segregation unit 104 of the one or more segregation units 104 comprises at least one of: an enclosure 106, the one or more adsorptive composites 112, one or more airflow-controlling units 114, and a gas-sealed flap 116. Each segregation unit 104 of the one or more segregation units 104 is operatively connected to the one or more sensors 118 and the one or more hardware processors 120 for segregating the one or more component gases from the atmospheric air.

In an exemplary embodiment, the enclosure 106 comprises at least one of: one or more inlet vents 108 and two or more outlet vents 110. The enclosure 106 is configured to obtain the atmospheric air into the enclosure 106 through the one or more inlet vents 108 for processing the atmospheric air. The enclosure 106 is configured to emit processed atmospheric air and the one or more component gases through the two or more outlet vents 110. The processed atmospheric air is the atmospheric air free from the one or more component gases. The one or more component gases comprise at least one of: carbon dioxide ($CO_2$) carbon dioxide ($CO_2$), methane ($CH_4$), nitrous oxide ($N_2O$), and the like. In another exemplary embodiment, the one or more component gases may comprises oxygen ($O_2$). The enclosure 106 is constructed from robust materials, such as, but not limited to, at least one of: stainless steel, high-grade polymers, and the like, that able to withstand the one or more environmental conditions during the segregation process.

In another exemplary embodiment, the internal surfaces of the enclosure 106 may be coated with a non-reactive layer to prevent any chemical interactions with the one or more adsorptive composites 112 and the processed atmospheric air. The one or more inlet vents 108 and the two or more outlet vents 110 are strategically positioned to maximize the intake of the atmospheric air from the surroundings and emission of the processed atmospheric air and the one or more component gases from the enclosure 106. The one or more inlet vents 108 and the two or more outlet vents 110 are constructed with materials that ensure durability and resistance to the one or more environmental conditions, corrosion and temperature variations.

In an exemplary embodiment, the one or more adsorptive composites 112 is operatively positioned in the enclosure 106. The one or more adsorptive composites 112 is configured to adsorb the one or more component gases from the atmospheric air during the processing of the atmospheric air. The processing of the atmospheric air involves, the atmospheric air obtained from the one or more inlet vents 108 interacts with the one or more adsorptive composites 112, where the one or more adsorptive composites 112 adsorb the one or more component gases and emit the processed atmospheric air through the two or more outlet vents 110. The one or more adsorptive composites selected from a group comprises, but not limited to, at least one of: amines, Zeolites, Metal Organic Frameworks (MOFs), and the like. The amines comprise, but not limited to, at least one of a: tetraethylenepentamine (TEPA), Monoethanolamine (MEA), Diethanolamine (DEA), Diethylenetriamine (DETA), Polyethylenimine (PEI), Methyldiethanolamine (MDEA), Piperazine (PZI), and the like. The one or more adsorptive composites is synthesized by bounding at least one of the: amines, Zeolites, Metal Organic Frameworks (MOFs) with a graphene ink applied to a ceramic substrate. The bounding may be selected from a group of techniques comprises, but not limited to, at least one of: plasma bounding, physical adsorption bounding, chemical bonding, thermal bounding, electrochemical bounding, layer-by-layer bounding, mechanical bounding, solvothermal and hydrothermal bounding, ultrasonic spray pyrolysis, and the like. The ceramic substrate is selected from a group of material comprises, but not limited to, at least one of: alumina ($Al_2O_3$), Zirconia ($ZrO_2$), Silicon Carbide (SiC), Cordierite ($2MgO \cdot 2Al_2O_3 \cdot 5SiO_2$), Titania ($TiO_2$), Barium Titanate ($BaTiO_3$), Magnesia (MgO), Hafnia ($HfO_2$), and the like.

In an exemplary embodiment, for a specific purpose of adsorbing carbon dioxide ($CO_2$) as one of the one or more component gases, the one or more adsorptive composites 112 is synthesized by bounding tetraethylenepentamine (TEPA) with the graphene ink applied to the alumina substrate. This synthesis process and the resulting material are necessary for the efficient capture and segregation of carbon dioxide ($CO_2$) from the atmospheric air. The TEPA is selected for its high affinity for carbon dioxide ($CO_2$) molecules. The TEPA is configured with multiple amine groups provide numerous active sites for carbon dioxide ($CO_2$) adsorption, making it highly effective for adsorbing the carbon dioxide ($CO_2$) molecules from the atmospheric air.

In an exemplary embodiment, for a specific purpose of adsorbing the methane ($CH_4$) as one of the one or more component gases, the one or more adsorptive composites 112 is synthesized by plasma bounding at least one of the: zeolites, MOFs, and amines such as, but not limited to, at least one of the: tetraethylenepentamine (TEPA), Monoethanolamine (MEA), Diethanolamine (DEA), Diethylenetriamine (DETA), Polyethylenimine (PEI) with the graphene ink applied to the alumina substrate. This synthesis process and the resulting material are necessary for the efficient capture and segregation of the methane ($CH_4$) from the atmospheric air.

In an exemplary embodiment, for a specific purpose of adsorbing the nitrous oxide ($N_2O$) as one of the one or more component gases, the one or more adsorptive composites 112 is synthesized by plasma bounding at least one of the: zeolites, MOFs, and amines such as, but not limited to, at least one of the: Methyldiethanolamine (MDEA), Piperazine (PZI), and the like with the graphene ink applied to the alumina substrate. This synthesis process and the resulting material are necessary for the efficient capture and segregation of the nitrous oxide ($N_2O$) from the atmospheric air.

In an exemplary embodiment, the one or more adsorptive composites 112 is operatively positioned in the enclosure 106 by using one or more perforated containers 112a oriented in one or more configurations. In another embodiment, the one or more adsorptive composites 112 is operatively positioned in the enclosure 106 by using containers 112a. The one or more configurations of the one or more perforated containers 112a comprises, but not limited to, at least one of a: horizontal stack configuration, vertical stack configuration, angled stack configuration (from 1° to 89°, from 91° to 179°), waveform surface configuration, and the like. The one or more adsorptive composites 112 may be synthesized in the one or more configurations comprises, but not limited to, at least one of a: spherical configuration, length cylinder configuration, toroid configuration, horizontal slab configuration, vertical slab configuration, angled slab configuration (from 1° to 89°, from 91° to 179°), and the like. The one or more perforated containers 112a may be configured in at least one of a: cuboid shape, spheroid shape, cylindrical shape, rectangle shape, and the like to hold the one or more adsorptive composites 112.

In an exemplary embodiment, the one or more airflow-controlling units 114 is operatively attached to at least one of the: one or more inlet vents 108 and two or more outlet vents 110 of the enclosure 106. The one or more airflow-controlling units 114 is configured to at least one of: a) drive the atmospheric air from surroundings into the enclosure 106 towards the one or more adsorptive composites 112 and b) release at least one of the: adsorbed one or more component gases and processed atmospheric air from the enclosure 106.

The one or more airflow-controlling units 114 comprises at least one of: blowers, fans, ducts, air handling units, and air pumps. The one or more airflow-controlling units 114 is configured to drive the atmospheric air from the surroundings into the enclosure 106 by initiating a first airflow-controlling unit 114a of the one or more airflow-controlling units 114 associated with the one or more inlet vents 108 based on one or more controlled signals generated by the one or more hardware processors 120. The one or more airflow-controlling units 114 is configured to emit the one or more component gases from the enclosure 106 by initiating a second airflow-controlling unit 114b of the one or more airflow-controlling units 114 based on the one or more controlled signals generated by the one or more hardware processors 120. Further, the one or more airflow-controlling units 114 is configured to emit the processed atmospheric air from the enclosure 106 by initiating a third airflow-controlling unit 114c of the one or more airflow-controlling units 114 associated with the two or more outlet vents 110 based on the one or more controlled signals by the one or more hardware processors 120.

In an exemplary embodiment, the gas-sealed flap 116 is operatively connected to at least one of the: one or more inlet vents 108 and two or more outlet vents 110 of the enclosure 106. The gas-sealed flap 116 is configured to one of: seal and unseal at least one of the: one or more inlet vents 108 and two or more outlet vents 110. The gas-sealed flap 116 associated with the one or more inlet vents 108 is configured to regulate a flow of the atmospheric air into the enclosure 106. Similarly, the gas-sealed flap 116 associated with the two or more outlet vents 110 is configured to release at least one of the: adsorbed one or more component gases and processed atmospheric air from the enclosure 106.

The gas-sealed flap 116 is associated with the one or more inlet vents 108 that is closed by the one or more hardware processors 120 to halt the flow of the atmospheric air into the enclosure 106 for releasing the adsorbed one or more component gases based on inducing electrical current into the one or more adsorptive composites 112. The gas-sealed flap 116 is associated with a first outlet vent 110a of the two or more outlet vents 110 that is opened by the one or more hardware processors 120 based on the one or more controlled signals to emit the adsorbed one or more component gases into diverse gas-storing cylinders. The gas-sealed flap 116 is associated with a second outlet vent 110b of the two or more outlet vents 110 that is opened by the one or more hardware processors 120 based on the one or more controlled signals to emit the processed atmospheric air from the enclosure 106.

In an exemplary embodiment, the one or more sensors 118 is operatively connected to the enclosure 106 associated with each segregation unit 104 of the one or more segregation units 104. In the illustrative embodiment, the one or more sensors may be strategically positioned at the one or more inlet vents 108 of the enclosure 106 to accurately monitor the incoming atmospheric air and the one or more operational parameters within the enclosure 106. In another exemplary embodiment, the one or more sensors 118 may also be placed at other critical points within each segregation unit 104 of the one or more segregation units 104, such as near the two or more outlet vents 110 and inside the enclosure 106, to generate sensor data.

The one or more sensors 118 is configured to generate the sensor data based on at least one of the: one or more environmental conditions and one or more operational parameters. The one or more sensors 118 comprises, but not limited to, at least one of: one or more temperature sensors, one or more pressure sensors, one or more humidity sensors, one or more gas concentration sensors, one or more airflow sensors, one or more particulate matter sensors, and the like. The one or more temperature sensors is configured to determine temperature of the incoming atmospheric air and the processed air, ensuring that the system 102 operates within optimal thermal conditions. The one or more temperature sensors is configured to monitor temperature variations that may affect the adsorption efficiency of the one or more adsorptive composites 112. The one or more pressure sensors is configured to determine pressure levels at the one or more inlet vents 108 and the two or more outlet vents 110 or maintaining the correct pressure differential, which is crucial for effective flow of the atmospheric air and gas segregation. The one or more humidity sensors is configured to determine moisture content in the incoming atmospheric air and within the enclosure 106. The moisture content may significantly impact an adsorption process, as excessive moisture may hinder the performance of the one or more adsorptive composites 112. The one or more gas concentration sensors is configured to determine concentration levels of the one or more component gases, such as carbon dioxide ($CO_2$), methane ($CH_4$), and nitrous oxide ($N_2O$), and the like in the atmospheric air. The determination of the concentration levels achieves the desired purity levels of the processed atmospheric air by the system 102. The one or more airflow sensors is configured to determine flow rates through the one or more inlet vents 108 and the two or more outlet vents 110. The flow rates are used to regulate the speed of the one or more airflow-controlling units 114, ensuring optimal interaction between the atmospheric air and the one or more adsorptive composites 112. The one or more particulate matter sensors is configured to determine a presence of particulate matter in the incoming atmospheric air. The determination of the presence of particulate matter ensures that the air entering the enclosure 106 is free from contaminants that may clog or damage the one or more adsorptive composites 112.

In an exemplary embodiment, the one or more environmental conditions comprises, but not limited to, at least one of a: temperature, pressure, humidity, concentrations of the one or more component gases. The one or more operational parameters comprises at least one of a: speed of the one or more airflow-controlling units 114, operational status of the gas-sealed flap 116, saturation level of the one or more adsorptive composites 112, and elapsed time for resetting the system 102. Based on the sensor data, the one or more hardware processors 120 maintains the optimal thermal conditions for adsorption, ensures proper pressure levels for efficient atmospheric air flow and segregation by actuating the gas-sealed flap 116. Continuous real-time monitoring ensures that the system 102 adapts to changing conditions quickly and efficiently. The one or more sensors 118 provides immediate feedback, allowing the system 102 to maintain optimal performance. The sensor data facilitates predicting when maintenance or replacement of the one or more adsorptive composites 112 is needed. The system 102 is configured to generate one or more maintenance alerts to ensure that components are serviced before they fail or degrade. The data collected by the one or more sensors 118 enables the system 102 to optimize the segregation process, ensuring maximum efficiency and minimal energy consumption. By continuously adjusting the one or more operational parameters based on real-time data, the system 102 may maintain high performance and reliability.

In an exemplary embodiment, the one or more hardware processors 120 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The one or more hardware processors 120 execute a set of computer-readable instructions for dynamically recommending the course of action sequences for performing the one or more actions associated with the segregation process. The one or more hardware processors 120 is high-performance processors capable of handling large volumes of data and complex computations. The one or more hardware processors 120 may be, but not limited to, at least one of: multi-core central processing units (CPU), graphics processing units (GPUs), and specialized Artificial Intelligence (AI) accelerators that enhance an ability of the system 102 to process real-time data from one or more sources simultaneously. The one or more hardware processors 120 is responsible for executing at least one of the: one or more artificial intelligence models and one or more predictive artificial intelligence models that analyze the sensor data, predict future conditions, and generate actionable insights for the segregation process. The one or more hardware processors 120 may also include, for example, microprocessors, microcomputers, microcontrollers, digital signal processors, central processing units, state machines, logic circuits, and/or any devices that manipulate data or signals based on operational instructions. Among other capabilities, the one or more hardware processors 120 may fetch and execute the set of computer-readable instructions in the memory unit 122 operationally coupled with the system 102 for performing tasks such as data-analysis, operational parameters optimization, input/output processing, and/or any other functions. Any reference to a task in the present disclosure may refer to an operation being or that may be performed on at least one of the: sensor data, historical data and the like. In another exemplary embodiment, the system 102 is configured to execute a set of computer-readable instructions in form of the plurality of subsystems 124 through at least one of: local computing platforms, hybrid computing platforms, and cloud computing platforms.

In an exemplary embodiment, the memory unit 122, which works in conjunction with the one or more hardware processors 120, is configured to store and manage vast amounts of data collected from the one or more sensors 118 and one or more sources. The memory unit 122 is composed of at least one of: a non-transitory volatile memory and the non-volatile memory, ensuring that data is readily accessible for processing while also being securely stored for long-term analysis and historical reference. The memory unit 122 comprises the set of computer-readable instructions in form of the plurality of subsystems 124.

In an exemplary embodiment, each segregation unit 104 of the one or more segregation units 104 is configured with one or more energy sources 132. The one or more energy sources 132 comprises at least one of: one or more renewable energy sources and one or more nonrenewable energy resources. In the illustrative embodiment, each segregation unit 104 of the one or more segregation units 104 is configured with the one or more renewable energy sources such as, but not limited to, at least one of: one or more solar panels, one or more wind turbines, one or more hydroelectric generators, one or more geothermal heat pumps, and the like. The one or more solar panels may be installed to capture and convert sunlight into electrical energy, providing the electrical current for each segregation unit 104 of the one or more segregation units 104. The one or more solar panels mounted on at least of: the enclosure 106, and adjacent structures of the enclosure 106 to harness solar energy effectively. The one or more wind turbines may be used to generate the electrical current from wind energy. The one or more wind turbines may be installed in locations with the adequate atmospheric air flow to ensure a steady supply of renewable energy. In another embodiment, the enclosure 106 is used outdoors, then the enclosure 106 may configured with one or more fixtures to hold the one or more wind turbines for their function. In cases where water flow is available, the one or more hydroelectric generators may be employed to convert kinetic energy of flowing water into the electrical current, supporting the operation of each segregation unit 104 of the one or more segregation units 104. The one or more geothermal heat pumps may be used to harness heat from earth to provide energy for heating or cooling processes within each segregation unit 104 of the one or more segregation units 104, enhancing energy efficiency and reducing reliance on conventional energy sources.

In an exemplary embodiment, each segregation unit 104 of the one or more segregation units 104 is configured to connect with green grids to draw power from a network that sources electricity from renewable energy projects. These green grids connection ensures that the one or more segregation units 104 operates with minimal environmental impact and supports the use of clean energy.

In an exemplary embodiment, the one or more energy sources 132 is operatively connected with one or more energy storage systems (ESS) 134. The one or more ESS 134 comprises, but is not limited to, at least one of: smart rechargeable batteries, capacitors, and other energy storage technologies. The one or more ESS 134 is configured to store excess electrical current generated by the one or more energy sources 132, ensuring a reliable power supply to each segregation unit 104 of the one or more segregation units 104, even during periods when renewable energy generation is low.

In the illustrative embodiment, the smart rechargeable batteries with a total capacity of 37.5 kWh are employed, capable of supporting 24 hours of continuous operation for each segregation unit 104, assuming an average of 5 hours of winter daylight exposure. These smart rechargeable batteries are strategically stored in or near the enclosure 106 to provide seamless power integration and ease of maintenance. When the one or more segregation units 104 is connected to a power grid, including the green grids, the electrical current consumption from the one or more ESS 134 may be optimized. For instance, the one or more ESS 134 utilization may be reduced to 0.7 kWh for two hours or 1.3 kWh for four hours of operation, significantly extending the operational period without drawing heavily on stored electrical current. This configuration ensures that the one or more segregation units 104 remain operational during the green grids power outages or periods of low renewable energy generation.

Moreover, the one or more ESS 134 include advanced energy management systems (EMS) to monitor and control the electrical current flow between the one or more energy sources 132, the one or more ESS 134, and the one or more segregation units 104. The EMS is configured to optimize the use of the available electrical current, prioritizing the one or more energy sources 132 when available, and seamlessly switching to store the electrical current when necessary. This intelligent management of energy resources maximizes efficiency, reduces operational costs, and minimizes an environmental footprint of each segregation unit 104 of the one or more segregation units 104.

Though few components and the plurality of subsystems 124 are disclosed in FIG. 1, there may be additional components and subsystems which is not shown, such as, but not limited to, ports, routers, repeaters, firewall devices, network devices, the database 128, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the one or more communication devices 130 connected to the database 128, one skilled in the art can envision that the system 102, and the one or more communication devices 130 may be connected to several user devices located at various locations and several databases via the one or more communication networks 126.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

Figure 2:
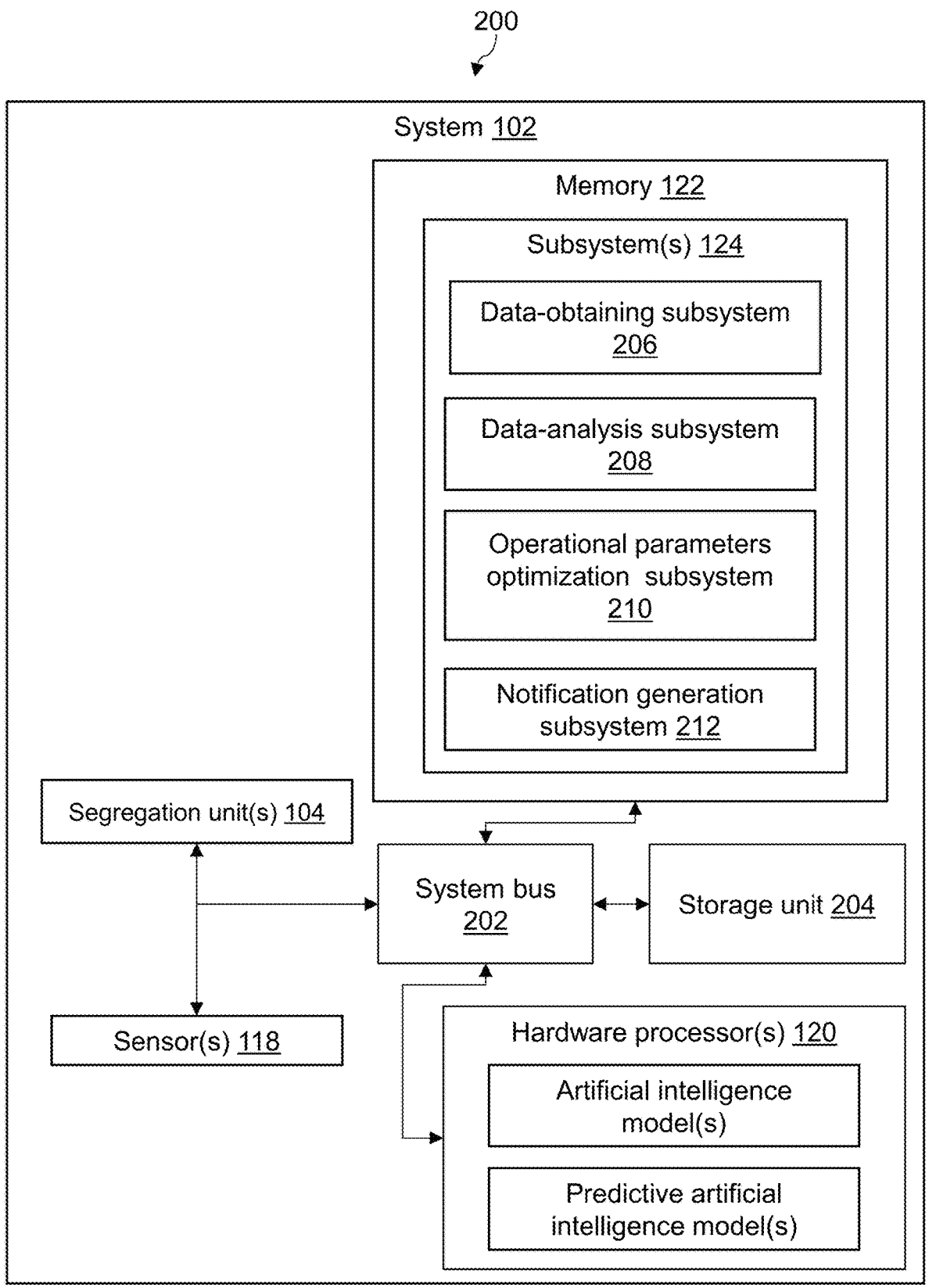
FIG. 2 illustrates an exemplary block diagram representation of the system as shown in FIG. 1 for segregating the one or more component gases from the atmospheric air, in accordance with an embodiment of the present disclosure.

FIG. 2 illustrates an exemplary block diagram representation 200 of the system 102 as shown in FIG. 1 for segregating the one or more component gases from the atmospheric air, in accordance with an embodiment of the present disclosure.

In an exemplary embodiment, the system 102 comprises at least one of the: one or more segregation units 104, one or more sensors 118, one or more hardware processors 120, memory unit 122 and a storage unit 204. The one or more hardware processors 120, the memory unit 122 and the storage unit 204 are communicatively coupled through a system bus 202 or any similar mechanism. The system bus 202 functions as the central conduit for data transfer and communication between the one or more hardware processors 120, the memory unit 122, and the storage unit 204. The system bus 202 facilitates the efficient exchange of information and instructions, enabling coordinated operation of the system 102. The system bus 202 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

The memory unit 122 is operatively connected to the one or more hardware processors 120. The memory unit 122 comprises the set of computer-readable instructions in the form of the plurality of subsystems 124. The plurality of subsystems 124 comprises a data-obtaining subsystem 206, a data-analysis subsystem 208, and an operational parameters optimization subsystem 210. The one or more hardware processors 120, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 120 may also include embedded controllers, such as generic or programmable logic devices or arrays, application-specific integrated circuits, single-chip computers, and the like.

The memory unit 122 may be the non-transitory volatile memory and the non-volatile memory. The memory unit 122 may be coupled to communicate with the one or more hardware processors 120, such as being a computer-readable storage medium. The one or more hardware processors 120 may execute machine-readable instructions and/or source code stored in the memory unit 122. A variety of machine-readable instructions may be stored in and accessed from the memory unit 122. The memory unit 122 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 122 includes the plurality of subsystems 124 stored in the form of machine-readable instructions on any of the above-mentioned storage media and may be in communication with and executed by the one or more hardware processors 120.

The storage unit 204 may be a cloud storage or the database 128 such as those shown in FIG. 1. The storage unit 204 may store, but not limited to, recommended course of action sequences dynamically generated by the system 102. These action sequences are based on the sensor data. Additionally, the storage unit 204 may store the historical data, and other relevant information necessary for optimizing the one or more operational parameters. By centralizing this information in the storage unit 204, the system 102 is able to access and retrieve it efficiently and actuate at least one of the: one or more airflow-controlling units 114, gas-sealed flap 116. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the data-obtaining subsystem 206 is configured to obtain the generated sensor data from the one or more sensors 118. Upon activation of each segregation unit 104 of the one or more segregation units 104, the data-obtaining subsystem 206 interfaces with the one or more sensors 118 through dedicated communication protocols and interfaces, which may include at least one of: analog communication standards and digital communication standards such as, but not limited to, Inter-Integrated Circuit (I2C), Serial Peripheral Interface (SPI), universal asynchronous receiver/transmitter (UART), or network-based protocols like Transmission Control Protocol/Internet Protocol (TCP/IP), depending on a specific sensor technology in use. The data-obtaining subsystem 206 is responsible for efficiently capturing data from the one or more sensors 118, ensuring data integrity and accuracy. The data-obtaining subsystem 206 may incorporate features such as, but not limited to, at least one of: data buffering, error checking, and timestamping to manage the data flow effectively. The data-obtaining subsystem 206 may also support various data formats and protocols for compatibility with various types of sensors of the one or more sensors 118 and ensure that the sensor data collected from the one or more sensors 118 is correctly interpreted and formatted for subsequent analysis.

In an exemplary embodiment, the data-analysis subsystem 208 is configured to process and analyze the sensor data obtained from the one or more sensors 118. The data-analysis subsystem 208 is configured to utilize the one or more artificial intelligence models to generate the one or more controlled signals based on the analysis of the sensor data. The one or more controlled signals comprises information related to at least one of: adjusting the speed of the one or more airflow-controlling units 114, changing the operational status of the gas-sealed flap 116, initiating the release of the adsorbed one or more component gases, triggering one or more maintenance alerts for the one or more adsorptive composites 112, and scheduling the elapsed time for resetting the system 102.

The data-analysis subsystem 208 may issue the one or more controlled signals to modify the speed or operational settings of the one or more airflow-controlling units 114, such as the blowers, the fans, and the air pumps. This adjustment facilitates maintain optimal flow through each segregation unit 104, ensuring efficient processing of the atmospheric air and effective separation of the one or more component gases. The one or more controlled signals may instruct the system 102 to one of: open the gas-sealed flap 116 and close the gas-sealed flap 116 associated with the one or more inlet vents 108 and the two or more outlet vents 110. This regulation of the flow improves in controlling the intake of the atmospheric air and the release of the processed air and the one or more component gases. The data-analysis subsystem 208 generates the one or more controlled signals to facilitate the release of the one or more component gases that have been adsorbed by the one or more adsorptive composites 112. This action may involve activating specific mechanisms or valves to channel the adsorbed one or more component gases to one of: designated storage systems and disposal systems. The data-analysis subsystem 208 may generate the one or more controlled signals to identify when the one or more adsorptive composites 112 require maintenance or replacement based on their saturation levels or performance metrics. The data-analysis subsystem 208 generates the one or more maintenance alerts to notify the one or more about the need for intervention. The data-analysis subsystem 208 generates the one or more controlled signals to schedule and manage the reset cycles of the system 102. This includes timing for cleaning, recalibration, or other maintenance procedures to ensure the system 102 operates within its one or more optimal parameters.

In an exemplary embodiment, the one or more artificial intelligence models is a Recurrent Neural Network (RNN) model. The RNN model is a type of neural network designed to process sequential data by maintaining a form of memory across time steps. This is particularly useful for time-series data or any data where temporal dependencies are crucial. The RNN model are well-suited for tasks involving sequences because they can remember previous sensor data due to their feedback loops, making them adept at predicting future values based on the historical data. The RNN model is a long short-term memory (LSTM) network. The LSTM network is a specific type of RNN that addresses the problem of learning long-term dependencies in sequences. The LSTM network includes memory cells that may maintain the sensor data over long periods and gates that control the flow of the sensor data into and out of these memory cells. The LSTM network improves the RNN model ability to remember and use the sensor data from the past, which is essential for predicting future operational needs or patterns based on the historical data.

The LSTM network processes the historical data related to the operation of the one or more segregation units 104. This historical data may include past performance metrics, the one or more environmental conditions, and one or more operational settings. By analyzing this historical data, the LSTM network learns patterns and trends in how various parameters affect system 102 performance. For instance, The LSTM network may identify how changes in the one or more environmental conditions influence the efficiency of the one or more segregation units 104 for segregating the one or more component gases from the atmospheric air. The LSTM network uses the learned patterns to optimize the one or more operational parameters such as the speed of the one or more airflow-controlling units 114, the timing of gas-sealed flap 116 operations, and the scheduling of maintenance activities. This optimization supports to improve the overall efficiency and effectiveness of each segregation unit 104.

In an exemplary embodiment, the Reinforcement Learning (RL) is an area of machine learning where the system 102 learns to make decisions by receiving rewards or penalties based on its actions. The goal is to maximize cumulative rewards over time. In the context of the system 102, RL models are used to continuously adjust and improve the one or more operational parameters for the one or more segregation units 104. A reinforcement learning approach is employed to optimize the efficiency of the one or more segregation units 104 across a geographical region. This involves coordinating the operations of the one or more segregation units 104 to ensure that they work harmoniously and that resources are used effectively. The RL model evaluates the performance of the one or more segregation units 104 based on real-time feedback from the one or more environment conditions, such as the efficiency of segregating the one or more component gases and the impact of the one or more operational parameters. The combination of LSTM and RL models ensures that the system 102 not only adapts to changing conditions but also continuously improves the system 102 performance based on both historical data and the real-time sensor data from the one or more sensors 118.

In an exemplary embodiment, the operational parameters optimization subsystem 210 is configured to use the one or more controlled signals from the data-analysis subsystem 208 and the one or more predictive artificial intelligence models to optimize the one or more operational parameters. The operational parameters optimization subsystem 210 is configured to actuate the gas-sealed flap 116 associated with at least one of the: one or more inlet vents 108 and two or more outlet vents 110. The operational parameters optimization subsystem 210 is configured to regulate the one or more airflow-controlling units 114, thereby the one or more adsorptive composites 112 configured to segregate the one or more component gases from the atmospheric air. The one or more predictive artificial intelligence models is a Reinforcement Learning (RL) model. The RL model comprises at least one of a: Deep Q-Network (DQN) and Policy Gradient method, combined with the RNN model. The one or more predictive artificial intelligence models is employed to forecast future operational needs and optimize performance based on the historical data and the real-time sensor data. The one or more predictive artificial intelligence models use these forecasts to inform adjustments in the system's 102 operation.

The RL model is configured to predict one or more saturation rates of the one or more adsorptive composites 112 for optimizing the one or more operational parameters. The DQN is a specific RL model that uses deep learning to approximate the value function of the one or more controlled signals. The DQN facilitates in determining the best actions to take based on the state of the system 102 to maximize the saturation level of the one or more adsorptive composites 112. The Policy Gradient method directly optimizes the policy (i.e., the strategy that the RL agent uses to decide actions) by calculating gradients of expected rewards with respect to the one or more controlled signals). The RL model, combining the DQN and the Policy Gradient method, is configured to predict the one or more saturation rates of the one or more adsorptive composites 112 for optimizing the one or more operational parameters. The predictions improve in understanding how filled the one or more adsorptive composites 112 is with the one or more component gases, which is crucial for optimizing their use and replacement.

The RL model uses the one or more saturation rates of the one or more adsorptive composites 112 to determine the optimal timing for actuating the gas-sealed flap 116 associated with the one or more inlet valve 108 and the two or more outlet valves 110. The actuation of the gas-sealed flap 116 ensures that the flow and the separation processes are managed efficiently, maintaining the effectiveness of segregation of the one or more component gases from the atmospheric air with the minimizing the electrical current consumption. Similarly, the RL model provides guidance on adjusting the operation of the one or more airflow-controlling units 114 to optimize the atmospheric air movement through the one or more adsorptive composites 112. This adjustment improves the overall efficiency of gas segregation by ensuring that the atmospheric air interacts effectively with the one or more adsorptive composites 112. By optimizing the one or more operational parameters, the one or more hardware processors 120 ensures that the one or more adsorptive composites 112 is used efficiently, maintaining their effectiveness in removing the one or more component gases (e.g., $CO_2$, $CH_4$, $N_2O$) from the atmospheric air.

In an exemplary embodiment, the plurality of subsystems 124 further comprises a notification generation subsystem 212. The notification generation subsystem 212 is configured to generate the one or more maintenance alerts if the one or more adsorptive composites 112 need at least one of: replacement and maintenance. The notification generation subsystem 212 works closely with the data-analysis subsystem 208, which analyzes the sensor data to assess the saturation levels and overall health of the one or more adsorptive composites 112. Based on this analysis, the data-analysis subsystem 208 delivers relevant information to the notification generation subsystem 212. The notification generation subsystem 212 uses predefined thresholds and criteria to determine when the one or more maintenance alerts need to be generated. For instance, if the saturation level of the one or more adsorptive composites 112 reach a critical point, the notification generation subsystem 212 will generate a replacement alert as the one or more maintenance alerts. The notification generation subsystem 212 may send the one or more maintenance alerts through multiple channels, such as, but not limited to, at least one of: email, short message service (SMS), and a dedicated maintenance dashboard, ensuring that the one or more users is promptly informed.

FIGS. 3A-3E illustrate multiple exemplary embodiments of the one or more segregation units 104 for segregating the one or more component gases from the atmospheric air, in accordance with an embodiment of the present disclosure.

Figure 3A:
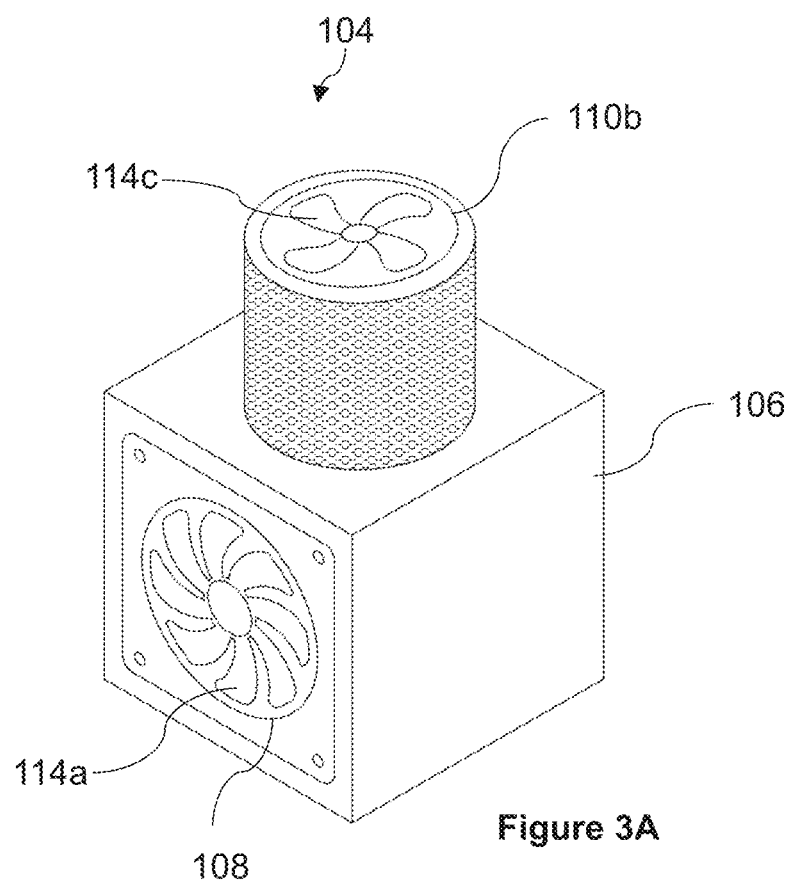
FIGS. 3A-3E illustrate multiple exemplary embodiments of one or more segregation units for segregating the one or more component gases from the atmospheric air, in accordance with an embodiment of the present disclosure.
Figure 3B:
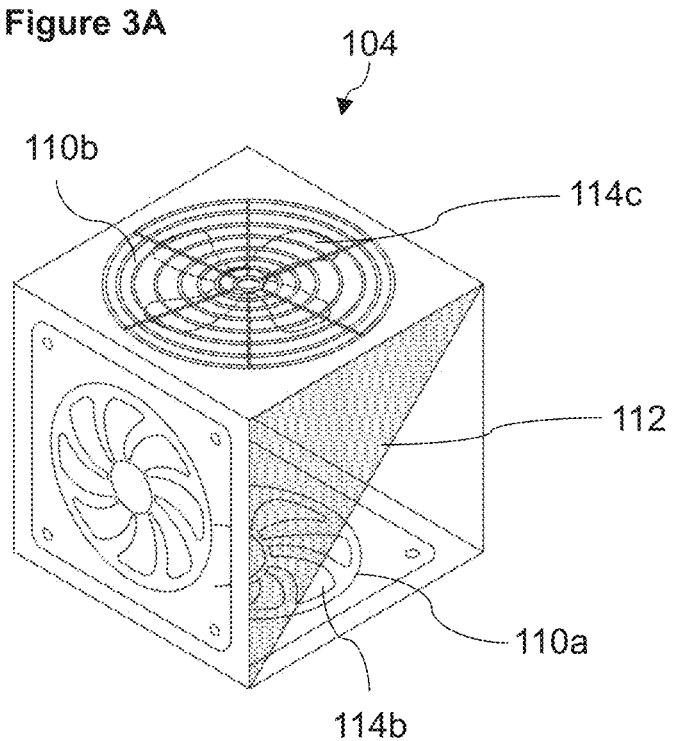

In accordance with an exemplary embodiment of the present disclosure, FIGS. 3A and 3B illustrate exemplary embodiments of the one or more segregation units 104 used in the system 102 for segregating the one or more component gases from the atmospheric air. As illustrated in FIGS. 3A and 3B, the enclosure 106 is in cuboid structure comprises the one or more inlet vents 108, the first outlet vent 110a of the two or more outlet vents 110, and the second outlet vent 110b of the two or more outlet vents 110. The one or more inlet vents 108 configured with the first airflow-controlling unit 114a of the one or more airflow-controlling units 114 to drive the atmospheric air from surroundings into the enclosure 106 towards the one or more adsorptive composites 112. The first outlet vent 110a configured with the second airflow-controlling unit 114b of the one or more airflow-controlling units 114 to release the adsorbed one or more component gases from the enclosure 106. Further, the second outlet vent 110b is configured with the third airflow-controlling unit 114c of the one or more airflow-controlling units 114 to release the processed atmospheric air from the enclosure 106. In the illustrative embodiment, as illustrated in FIGS. 3A and 3B, the shape of the one or more adsorptive composites 112 is the angled slab configuration of 45 degree. The one or more adsorptive composites 112 is positioned in the enclosure 106 diagonally to adsorb the one or more component gases from the atmospheric air when the atmospheric air interacts with the one or more adsorptive composites 112. The processed atmospheric air is released through the second outlet vent 110b whereas the one or more component gases is released through the first outlet vent 110a upon inducing the electrical current into the one or more adsorptive composites 112.

Figure 3C:
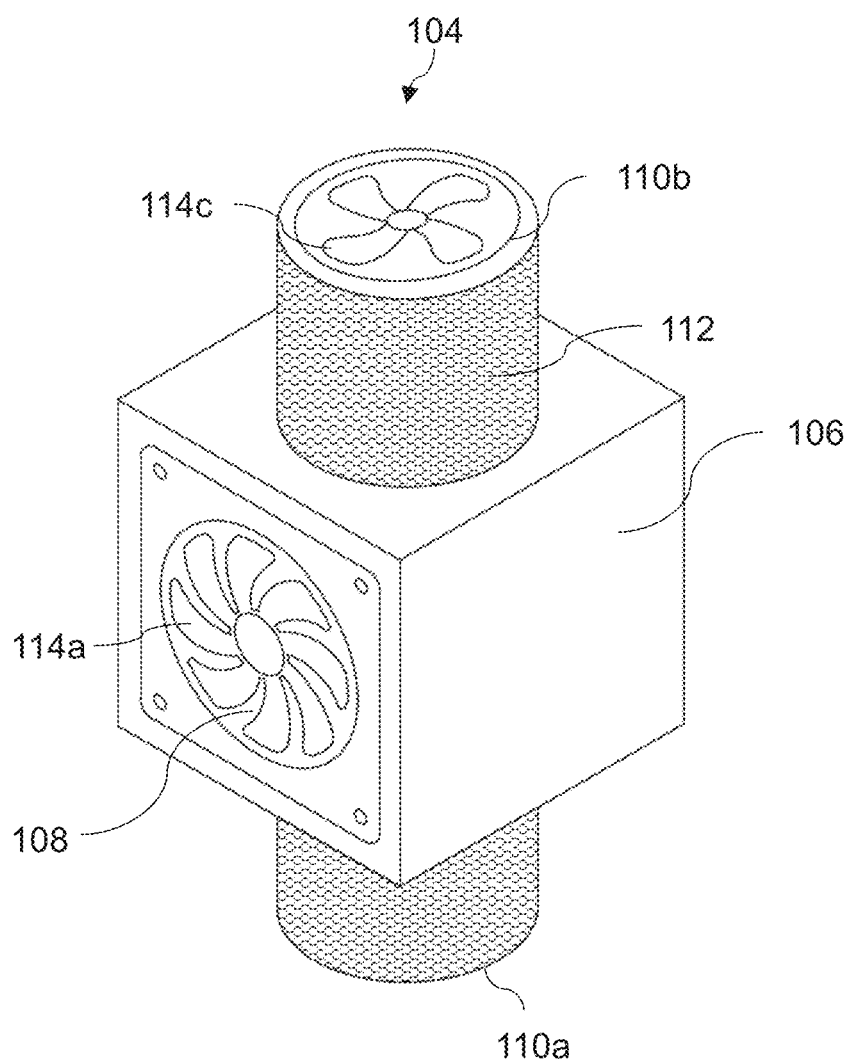

In another exemplary embodiment, as illustrated in FIG. 3C, the enclosure 106 is in cuboid structure comprises the one or more inlet vents 108, the first outlet vent 110a of the two or more outlet vents 110, and the second outlet vent 110b of the two or more outlet vents 110. However, the one or more adsorptive composites 112 is operatively positioned in the enclosure 106 by using the one or more perforated containers 112a. In the illustrative embodiment, the one or more perforated containers 112a may be in the length cylinder configuration. When the atmospheric air interacts with the one or more adsorptive composites 112, the processed atmospheric air is release through the second outlet vent 110b whereas the one or more component gases is released through the first outlet vent 110a upon inducing the electrical current into the one or more adsorptive composites 112.

Figure 3D:
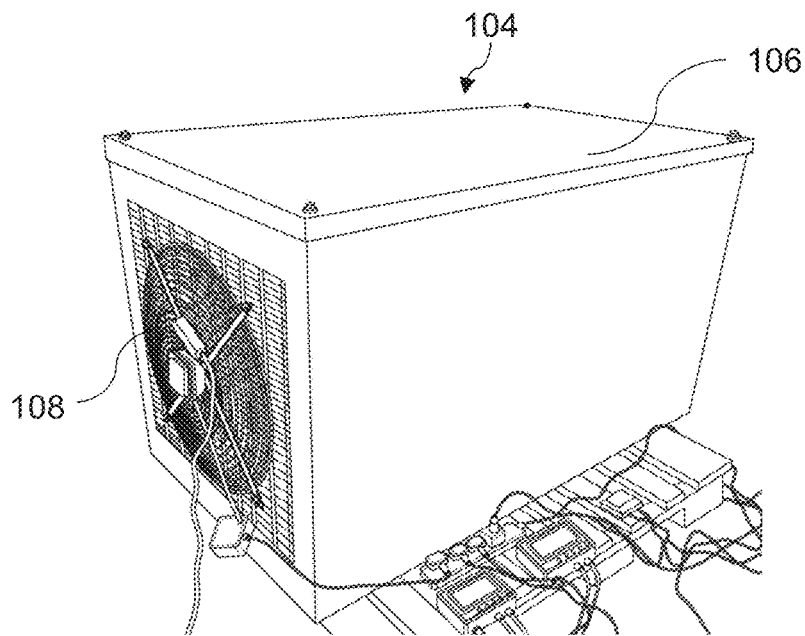
Figure 3E:
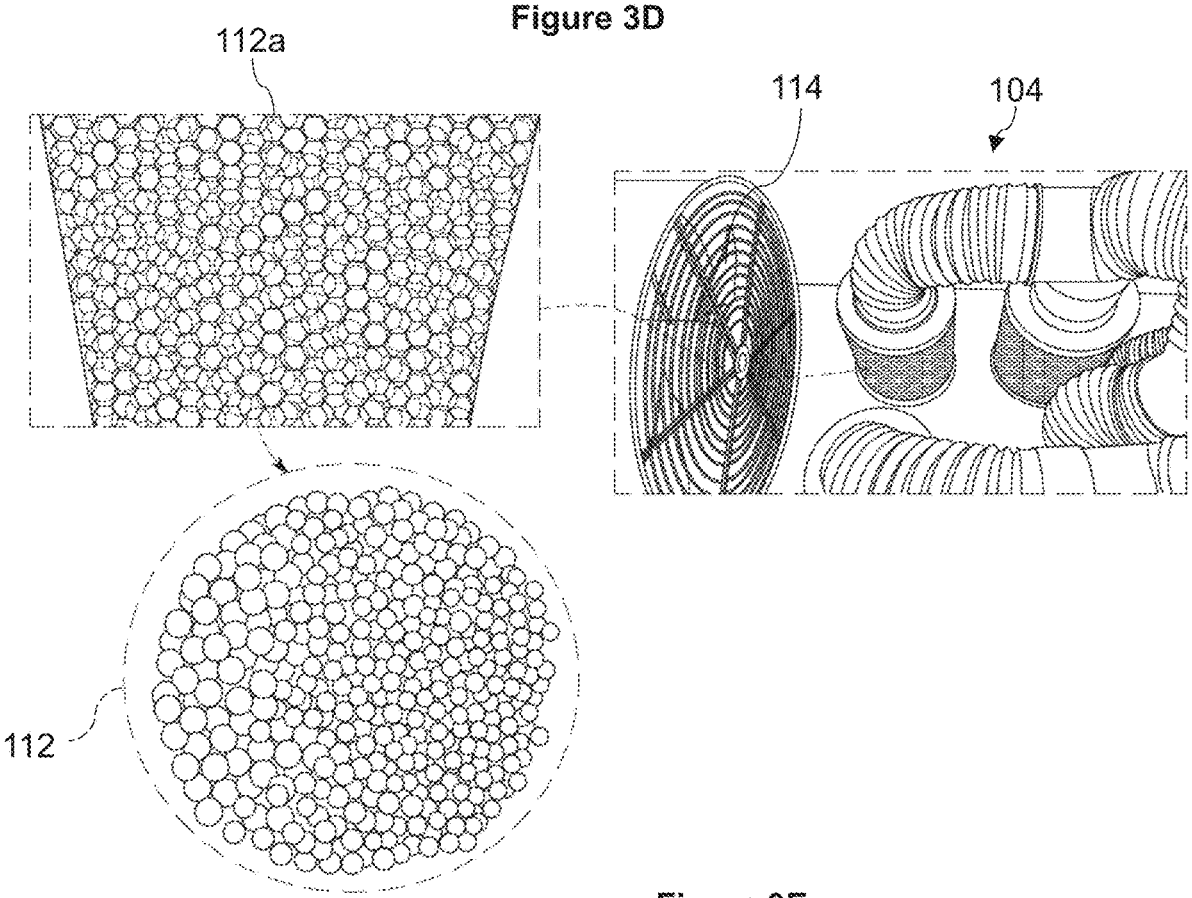

In another exemplary embodiment, as illustrated in FIG. 3D, the enclosure 106 is in rectangular shape configured with the one or more inlet vents 108. The one or more inlet vents 108 is configured with the one or more airflow-controlling units 114 to drive the atmospheric air from surroundings into the enclosure towards the one or more adsorptive composites 112. FIG. 3E, illustrates internal components of the one or more segregation units 104. The internal components is the one or more adsorptive composites. The one or more adsorptive composites 112 is operatively positioned in the enclosure 106 by using the one or more perforated containers 112a.

Figure 4A:
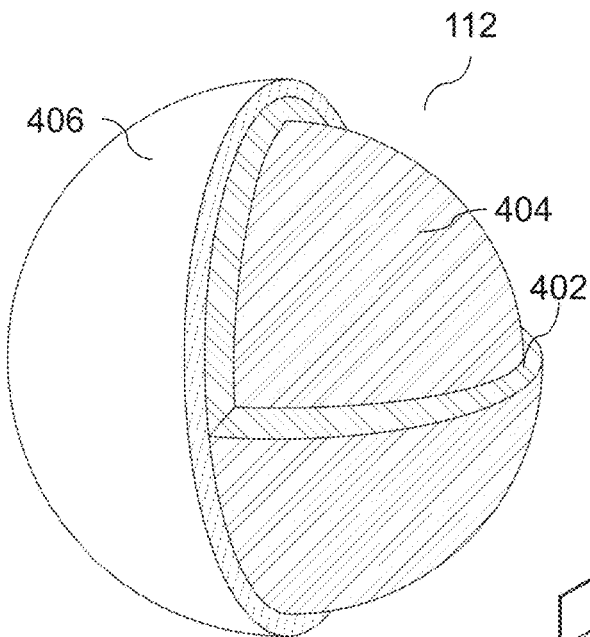
FIGS. 4A-4C illustrate multiple exemplary embodiments of one or more adsorptive composites for adsorbing the one or more component gases from the atmospheric air, in accordance with an embodiment of the present disclosure.
Figure 4B:
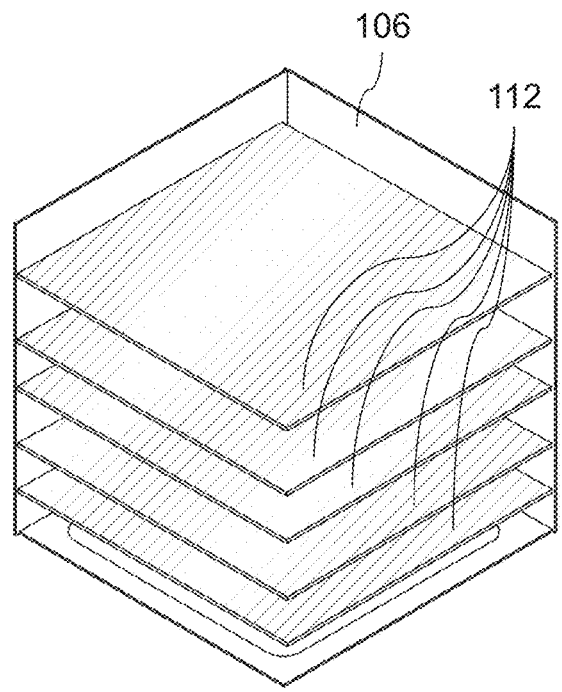
Figure 4C:
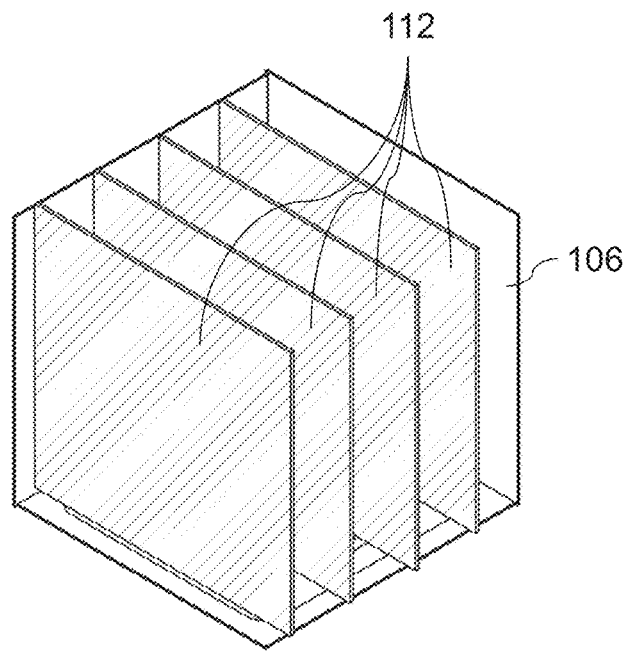

FIGS. 4A-4C illustrate multiple exemplary embodiments of the one or more adsorptive composites 112 for adsorbing the one or more component gases from the atmospheric air, in accordance with an embodiment of the present disclosure.

In accordance with an exemplary embodiment of the present disclosure, FIG. 4A illustrate an exemplary embodiment of the one or more adsorptive composites 112. The one or more adsorptive composites 112 is depicted in a spherical shape for optimizing the surface area for the carbon dioxide ($CO_2$) 406 adsorption. This spherical shape enhances the efficiency of the carbon dioxide ($CO_2$) 406 adsorption due to the increased interaction area between the one or more adsorptive composites 112 and the atmospheric air. The outer layer of the one or more adsorptive composites 112 comprises TEPA combined with a graphene ink 402. The TEPA is known for its exceptional carbon dioxide ($CO_2$) 406 uptake capabilities, providing elevated adsorption efficiency and quicker adsorption times. The graphene ink 402 serves as a supportive matrix, enhancing the distribution and binding of TEPA on the composite's surface. The graphene ink 402 high surface area and conductivity contribute to the overall performance of the one or more adsorptive composites 112. The core structure of the one or more adsorptive composites 112 is made of the alumina substrate 404. The alumina substrate 404 provides a stable and durable base for the one or more adsorptive composites 112, ensuring longevity and structural integrity during repeated adsorption-desorption cycles. The synthesis process involves the TEPA bound to the graphene ink 402 through a plasma process. This technique ensures a strong and uniform attachment of TEPA molecules to the graphene ink 402, enhancing the composite's adsorption properties. The TEPA with the graphene ink 402 is applied to the alumina substrate 404 through a painting process. This process ensures an even coating of the TEPA with graphene ink 402 on the alumina substrate 404. Following the application, the one or more adsorptive composites 112 undergoes a baking process. The baking process facilitates solidifying the bond between the TEPA with the graphene ink 402, and the alumina substrate 404, resulting in the robust and effective one or more adsorptive composites 112.

In accordance with an exemplary embodiment of the present disclosure, FIG. 4B illustrate an exemplary embodiment of the one or more adsorptive composites 112 arranged in the enclosure 106 with the horizontal stack configuration. The FIG. 4C illustrate an exemplary embodiment of the one or more adsorptive composites 112 arranged in the enclosure 106 with the vertical stack configuration. In another exemplary embodiment, the one or more adsorptive composites 112 of 1.5 cm diameter spheres are used for evaluating at least one of: data analysis and performance metrics. Under standard temperature and pressure (STP) conditions, with 50% humidity and using a 2,350 cubic foot perforated container of the one or more perforated containers 112a, the system 102 processes air at a rate of 1,607.55 cubic meters per minute. This high processing rate ensures that large volumes of air can be treated efficiently. At a capture efficiency of 60%, the system 102 achieves a cost of $100 per metric ton of the carbon dioxide ($CO_2$) 406 captured. Specific capture efficiencies for different environments have been determined, in rural areas: 30.4% capture of the carbon dioxide ($CO_2$) 406, achieves the target cost. In rural areas: 30.4% capture of the carbon dioxide ($CO_2$) 406, achieves the target cost. The system 102 has achieved a capture efficiency of 29% with a 1/8 Technology Readiness Level (TRL) 7 demonstration scale unit. This near-target efficiency demonstrates the viability and potential scalability of the system 102.

Figure 5:
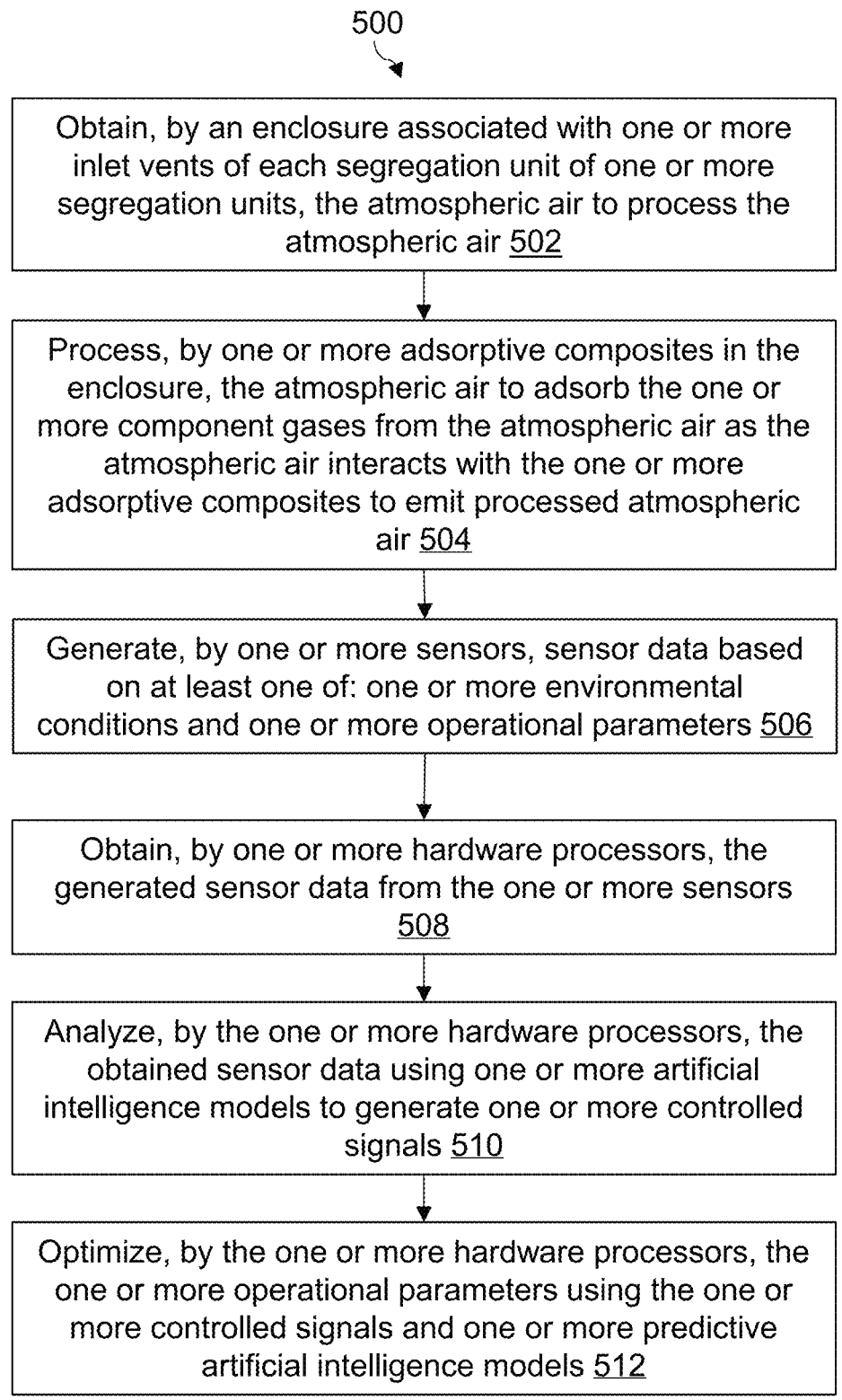
FIG. 5 illustrates an exemplary flow chart of a method for segregating the one or more component gases from the atmospheric air, in accordance with an embodiment of the present disclosure.

FIG. 5 illustrates an exemplary flow chart of a method 500 for segregating the one or more component gases from the atmospheric air, in accordance with an embodiment of the present disclosure.

At step 502, the method 500 includes obtaining, by the enclosure associated with the one or more inlet vents of each segregation unit of the one or more segregation units, the atmospheric air to process the atmospheric air. The enclosure comprises at least one of the: one or more inlet vents and two or more outlet vents. The enclosure is configured to obtain the atmospheric air into the enclosure through the one or more inlet vents for processing the atmospheric air and emit the processed atmospheric air and the one or more component gases through the two or more outlet vents. The one or more component gases comprise at least one of: carbon dioxide ($CO_2$), methane ($CH_4$), nitrous oxide ($N_2O$), and the like.

At step 504, the method 500 includes processing, by the one or more adsorptive composites in the enclosure, the atmospheric air to adsorb the one or more component gases from the atmospheric air as the atmospheric air interacts with the one or more adsorptive composites to emit the processed atmospheric air. The processed atmospheric air is the atmospheric air free from the one or more component gases. The one or more adsorptive composites is synthesized by bounding the tetraethylenepentamine (TEPA) with the graphene ink applied to the alumina substrate. The one or more adsorptive composites is operatively positioned in the enclosure by using the one or more perforated containers oriented in the one or more configurations. The one or more configurations of the one or more perforated containers comprises, but not limited to, at least one of the: horizontal stack configuration, vertical stack configuration, angled stack configuration, waveform surface configuration, and the like. The one or more adsorptive composites may be synthesized in the one or more configurations comprises, but not limited to, at least one of the: spherical configuration, length cylinder configuration, toroid configuration, horizontal slab configuration, vertical slab configuration, angled slab configuration, and the like. The one or more perforated containers may be configured in at least one of a: cuboid shape, spheroid shape, cylindrical shape, rectangle shape, and the like to hold the one or more adsorptive composites.

At step 506, the method 500 includes generating, by the one or more sensors, the sensor data based on at least one of the: one or more environmental conditions and one or more operational parameters. The one or more sensors may be strategically positioned at the one or more inlet vents of the enclosure to accurately monitor the incoming atmospheric air and the one or more operational parameters within the enclosure. The one or more sensors comprises, but not limited to, at least one of the: one or more temperature sensors, one or more pressure sensors, one or more humidity sensors, one or more gas concentration sensors, one or more airflow sensors, one or more particulate matter sensors, and the like. The one or more environmental conditions comprises, but not limited to, at least one of the: temperature, pressure, humidity, concentrations of the one or more component gases. The one or more operational parameters comprises at least one of a: speed of the one or more airflow-controlling units, operational status of the gas-sealed flap, saturation level of the one or more adsorptive composites, and elapsed time for resetting the system.

At step 508, the method 500 includes obtaining, by the one or more hardware processors, the generated sensor data from the one or more sensors. Upon activation of each segregation unit of the one or more segregation units, the one or more hardware processors interfaces with the one or more sensors through dedicated communication protocols and interfaces. The one or more hardware processors is responsible for efficiently capturing data from the one or more sensors, ensuring data integrity and accuracy.

At step 510, the method 500 includes analyzing, by the one or more hardware processors, the obtained sensor data using the one or more artificial intelligence models to generate the one or more controlled signals. The one or more controlled signals comprises information related to at least one of: adjusting the speed of the one or more airflow-controlling units, changing the operational status of the gas-sealed flap, initiating the release of the adsorbed one or more component gases, triggering one or more maintenance alerts for the one or more adsorptive composites, and scheduling the elapsed time for resetting the system. The one or more artificial intelligence models is the RNN model. The RNN model is a long short-term memory (LSTM) network to optimize the one or more operational parameters such as the speed of the one or more airflow-controlling units, the timing of the gas-sealed flap operations, and the scheduling of maintenance activities.

At step 512, the method 500 includes optimizing, by the one or more hardware processors, the one or more operational parameters using the one or more controlled signals and the one or more predictive artificial intelligence models for at least one of the: actuating the gas-sealed flap associated with at least one of the: one or more inlet vents and two or more outlet vents associated with the enclosure to regulate the flow of the atmospheric air into the enclosure and release at least one of the: adsorbed one or more component gases and processed atmospheric air from the enclosure, and regulating the one or more airflow-controlling units, thereby the one or more adsorptive composites is configured to segregate the one or more component gases from the atmospheric air.

Figure 6:
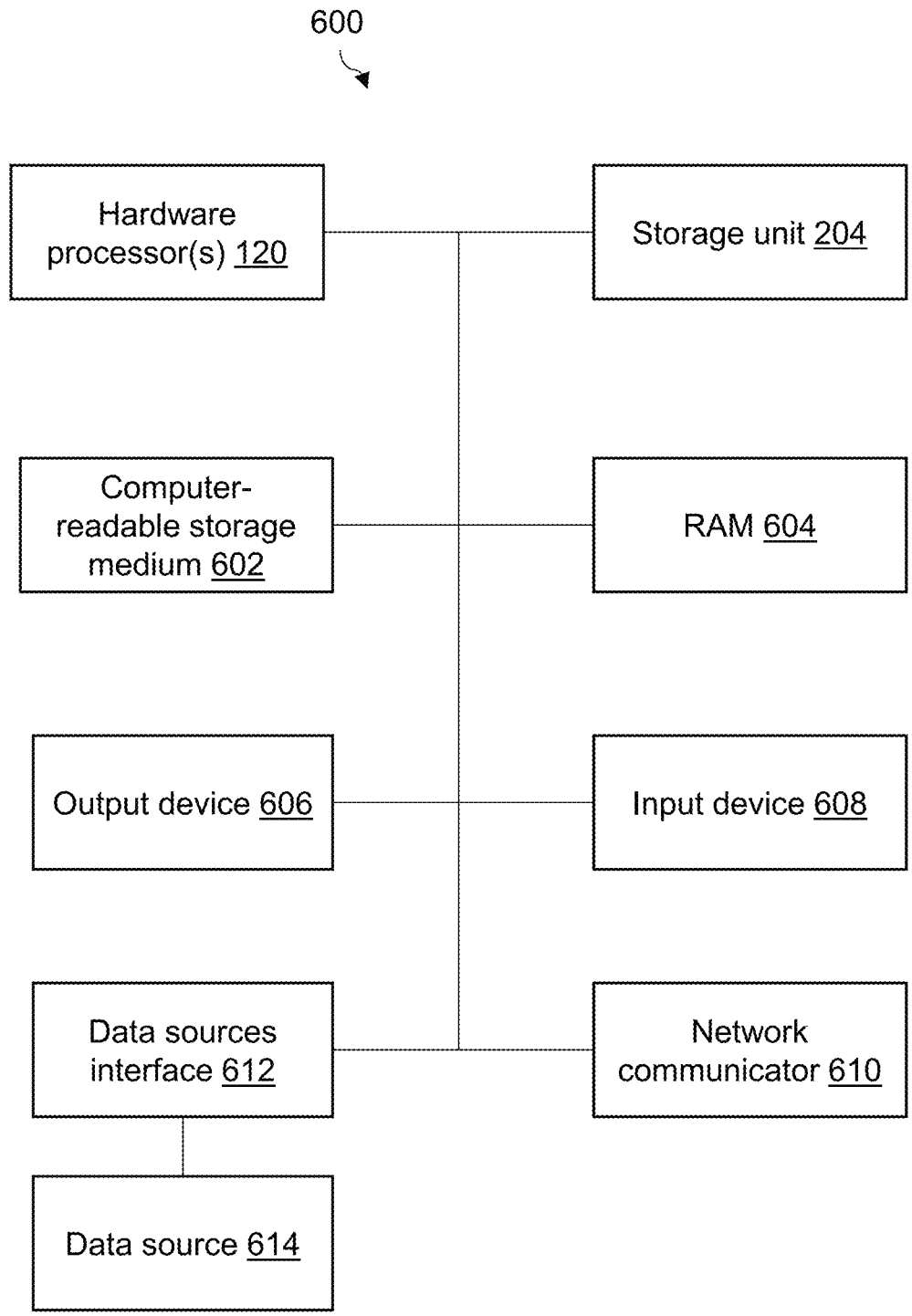
FIG. 6 illustrates an exemplary block diagram representation of one or more hardware platforms for implementation of the disclosed system, in accordance with an embodiment of the present disclosure.

FIG. 6 illustrates an exemplary block diagram representation of one or more hardware platforms 600 for implementation of the disclosed system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of a hardware platform 600 of the one or more hardware platforms 600. As illustrated, the hardware platform 600 may include additional components not shown, and some of the components described may be removed and/or modified. For example, a computer system with the multiple GPUs may be located on at least one of: internal printed circuit boards (PCBs) and external-cloud platforms including Amazon Web Services, internal corporate cloud computing clusters, or organizational computing resources.

The hardware platform 600 may be a computer system such as the system 102 that may be used with the embodiments described herein. The computer system may represent a computational platform that includes components that may be in the one or more hardware processors 120 or another computer system. The computer system may be executed by the one or more hardware processors 120 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 120 that execute software instructions or code stored on a non-transitory computer-readable storage medium 602 to perform methods of the present disclosure. The software code includes, for example, instructions to gather data and analyze the sensor data. For example, the plurality of subsystems 124 includes the data-obtaining subsystem 206, the data-analysis subsystem 208, the operational parameters optimization subsystem 210, and the notification generation subsystem 212.

The instructions on the computer-readable storage medium 602 are read and stored the instructions in the storage unit 204 or a random-access memory (RAM) 604. The storage unit 204 may provide a space for keeping static data where at least some instructions could be stored for later execution. The stored instructions may be further compiled to generate other representations of the instructions and dynamically stored in the RAM 604. The one or more hardware processors 120 may read instructions from the RAM 604 and perform actions as instructed.

The computer system may further include an output device 606 to provide at least some of the results of the execution as output including, but not limited to, visual information to the one or more users. The output device 606 may include a display on computing devices and virtual reality glasses. For example, the display may be a mobile phone screen or a laptop screen. The GUIs and/or text may be presented as an output on the display screen. The computer system may further include an input device 608 to provide the one or more users or another device with mechanisms for entering data and/or otherwise interacting with the computer system. The input device 608 may include, for example, a keyboard, a keypad, a mouse, or a touchscreen. Each of the output devices 606 and the input device 608 may be joined by one or more additional peripherals.

A network communicator 610 may be provided to connect the computer system to a network and in turn to other devices connected to the network including the other one or more segregation units 104. The network communicator 610 may include, for example, a network adapter such as a LAN adapter or a wireless adapter. The computer system may include a data sources interface 612 to access a data source 614. The data source 614 may be an information resource about the historical data. As an example, the database 128 of exceptions and rules may be provided as the data source 614. Moreover, knowledge repositories and curated data may be other examples of the data source 614. The data source 614 may include libraries containing, but not limited to, saturation level of the one or more adsorptive composites, historical environmental data, operational logs of the one or more segregation units 104, maintenance records, efficiency metrics of the segregation process, sensor calibration data, performance benchmarks, manufacturer specifications of the components, energy consumption patterns, predictive maintenance schedules, air quality indices, real-time meteorological data, pollutant dispersion models, system error logs, data from external monitoring agencies, compliance records with environmental regulations, user feedback logs and the like.

Numerous advantages of the present disclosure may be apparent from the discussion above. In accordance with the present disclosure, the system for segregating the one or more component gases from the atmospheric air provides several significant technical advantages and meets key objectives. The system is configured to efficiently capture and segregate the one or more component gases such as carbon dioxide ($CO_2$), methane ($CH_4$), nitrous oxide ($N_2O$) and the like from the atmospheric air, thus contributing to reducing greenhouse gas concentrations and mitigating climate change. One major advantage is the high capture efficiency of the one or more adsorptive composites, which are engineered to have a high affinity for carbon dioxide ($CO_2$), methane ($CH_4$), nitrous oxide ($N_2O$) and the like. This is achieved through the innovative use of TEPA bound with the graphene ink on the alumina substrate, resulting in exceptional gas uptake with shorter adsorption times and higher adsorption efficiency.

The one or more segregation units is configured for scalability, allowing deployment in various settings from urban areas to rural locations. This flexibility ensures that the system can be adapted to different one or more environmental conditions and operational requirements. Additionally, the integration of the one or more artificial intelligence models, such as Recurrent Neural Networks (RNN) with Long Short-Term Memory (LSTM) and Reinforcement Learning (RL) techniques, optimizes the one or more operational parameters dynamically. This results in enhanced efficiency, reduced operational costs, and minimal human intervention, making the system highly autonomous and effective in real-world applications.

The energy efficiency of the system is further enhanced by utilizing the one or more renewable energy sources, such as the one or more solar panels and the one or more wind turbines, and incorporating energy storage systems. This not only reduces a carbon footprint of the system itself but also ensures continuous operation even in remote or off-grid locations. Moreover, the system's robust one or more sensors and the data-analysis subsystem provide real-time monitoring and predictive maintenance capabilities. This ensures that the one or more adsorptive composites and other critical components are maintained in optimal condition, thereby extending the system's lifespan and reliability. The system also achieves a cost-effective solution for capturing the one or more component gases from the atmospheric air, meeting the target of $100 per metric ton of carbon dioxide ($CO_2$) captured, with demonstrated efficiency rates that surpass initial benchmarks.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A system for segregating one or more component gases from atmospheric air, comprising:
   one or more segregation units, each segregation unit of the one or more segregation units comprises:
   enclosure comprises one or more inlet vents and two or more outlet vents, configured to:
      obtain the atmospheric air into the enclosure through the one or more inlet vents for processing the atmospheric air, and
      emit processed atmospheric air and the one or more component gases through the two or more outlet vents;
      wherein the processed atmospheric air is the atmospheric air free from the one or more component gases,
   one or more adsorptive composites operatively positioned in the enclosure, configured to adsorb the one or more component gases from the atmospheric air during the processing of the atmospheric air as the atmospheric air interacts with the one or more adsorptive composites for emitting the processed atmospheric air;
   one or more airflow-controlling units operatively attached to at least one of the: one or more inlet vents and two or more outlet vents of the enclosure, configured to at least one of:
      drive the atmospheric air from surroundings into the enclosure towards the one or more adsorptive composites, and
      release at least one of the: adsorbed one or more component gases and processed atmospheric air from the enclosure;
   a gas-sealed flap operatively connected to at least one of the: one or more inlet vents and two or more outlet vents of the enclosure, configured to one of: seal and unseal at least one of the: one or more inlet vents and two or more outlet vents for at least one of:
      regulating a flow of the atmospheric air into the enclosure, and
      releasing at least one of the: adsorbed one or more component gases and processed atmospheric air from the enclosure;
   one or more sensors operatively connected to the enclosure associated with each segregation unit of the one or more segregation units, configured to generate sensor data based on at least one of: one or more environmental conditions and one or more operational parameters;
   one or more hardware processors operatively connected to the one or more sensors; and
   a memory unit operatively connected to the one or more hardware processors, wherein the memory unit comprises a set of computer-readable instructions in form of a plurality of subsystems, configured to be executed by the one or more hardware processors, wherein the plurality of subsystems comprises:
      a data-obtaining subsystem configured to obtain the generated sensor data from the one or more sensors;
      a data-analysis subsystem configured to generate one or more controlled signals based on analyzing the obtained sensor data using one or more artificial intelligence models; and
      an operational parameters optimization subsystem configured to use the one or more controlled signals and one or more predictive artificial intelligence models to optimize the one or more operational parameters for at least one of:
         actuating the gas-sealed flap associated with at least one of the: one or more inlet vents and two or more outlet vents, and
         regulating the one or more airflow-controlling units, thereby the one or more adsorptive composites configured to segregate the one or more component gases from the atmospheric air.

2. The system of claim 1, wherein the one or more component gases comprise at least one of: carbon dioxide ($CO_2$), methane ($CH_4$), and nitrous oxide ($N_2O$).

3. The system of claim 1, wherein the one or more adsorptive composites are selected from the group consisting of at least one of: amines, Zeolites, and Metal Organic Frameworks (MOFs),
   the amines comprise at least one of a: tetraethylenepentamine (TEPA), Monoethanolamine (MEA), Diethanolamine (DEA), Diethylenetriamine (DETA), Polyethylenimine (PEI), Methyldiethanolamine (MDEA), and Piperazine (PZI), and
   the one or more adsorptive composites is synthesized by bounding at least one of the: amines, Zeolites, Metal Organic Frameworks (MOFs) with a graphene ink applied to a ceramic substrate,
   the ceramic substrate is selected from a group of material comprises at least one of: alumina ($Al_2O_3$), Zirconia ($ZrO_2$), Silicon Carbide (SiC), Cordierite ($2MgO \cdot 2Al_2O_3 \cdot 5SiO_2$), Titania ($TiO_2$), Barium Titanate ($BaTiO_3$), Magnesia (MgO), and Hafnia ($HfO_2$), and
   the one or more adsorptive composites operatively positioned in the enclosure by using one or more perforated containers oriented in one or more configurations, the one or more configurations comprises at least one of a: horizontal stack configuration, vertical stack configuration, angled stack configuration, and waveform surface configuration.

4. The system of claim 1, wherein the one or more airflow-controlling units comprises at least one of: blowers, fans, ducts, air handling units, and air pumps configured to:
   drive the atmospheric air from the surroundings into the enclosure by initiating a first airflow-controlling unit of the one or more airflow-controlling units associated with the one or more inlet vents by the one or more hardware processors based on the one or more controlled signals, and
   emit the one or more component gases and the processed atmospheric air, from the enclosure by initiating a second airflow-controlling unit of the one or more airflow-controlling units and a third airflow-controlling unit of the one or more airflow-controlling units respectively associated with the two or more outlet vents by the one or more hardware processors based on the one or more controlled signals.

5. The system of claim 1, wherein the gas-sealed flap associated with the one or more inlet vents is closed by the one or more hardware processors to halt the flow of the atmospheric air into the enclosure for releasing the adsorbed one or more component gases based on inducing electrical current into the one or more adsorptive composites,
   the gas-sealed flap associated with a first outlet vent of the two or more outlet vents is opened by the one or more hardware processors based on the one or more controlled signals to emit the adsorbed one or more component gases into diverse gas-storing cylinders,
   the gas-sealed flap associated with a second outlet vent of the two or more outlet vents is opened by the one or more hardware processors based on the one or more controlled signals to emit the processed atmospheric air from the enclosure.

6. The system of claim 1, wherein the one or more sensors comprises at least one of: one or more temperature sensors, one or more pressure sensors, one or more humidity sensors, one or more gas concentration sensors, one or more airflow sensors, and one or more particulate matter sensors.

7. The system of claim 1, wherein the one or more environmental conditions comprises at least one of a: temperature, pressure, humidity, and concentrations of the one or more component gases; and
   the one or more operational parameters comprises at least one of a: speed of the one or more airflow-controlling units, operational status of the gas-sealed flap, saturation level of the one or more adsorptive composites, and elapsed time for resetting the system.

8. The system of claim 1, wherein the one or more controlled signals comprises information related to at least one of: adjusting the speed of the one or more airflow-controlling units, changing the operational status of the gas-sealed flap, initiating the release of the adsorbed one or more component gases, triggering one or more maintenance alerts for the one or more adsorptive composites, and scheduling the elapsed time for resetting the system.

9. The system of claim 1, wherein the one or more artificial intelligence models is a Recurrent Neural Network (RNN) model,
   the Recurrent Neural Network (RNN) model is a long short-term memory (LSTM) network configured to optimize the one or more operational parameters based on historical data.

10. The system of claim 1, wherein the one or more predictive artificial intelligence models is a Reinforcement Learning (RL) model,
   the Reinforcement Learning (RL) model comprises at least one of a: Deep Q-Network (DQN) and Policy Gradient method, combined with the Recurrent Neural Network (RNN) model, configured to predict one or more saturation rates of the one or more adsorptive composites for optimizing the one or more operational parameters.

11. The system of claim 1, wherein the data-analysis subsystem uses a reinforcement learning approach to optimize an efficiency of the one or more segregation units across a geographical region.

12. The system of claim 1, wherein the plurality of subsystems comprises a notification generation subsystem,
   the notification generation subsystem configured to generate the one or more maintenance alerts if the one or more adsorptive composites need at least one of: replacement and maintenance.

13. A method for segregating one or more component gases from atmospheric air, comprising:
   obtaining, by an enclosure associated with one or more inlet vents of each segregation unit of one or more segregation units, the atmospheric air to process the atmospheric air;
   processing, by one or more adsorptive composites in the enclosure, the atmospheric air to adsorb the one or more component gases from the atmospheric air as the atmospheric air interacts with the one or more adsorptive composites to emit processed atmospheric air;
   wherein the processed atmospheric air is the atmospheric air free from the one or more component gases;
   generating, by one or more sensors, sensor data based on at least one of: one or more environmental conditions and one or more operational parameters;
   obtaining, by one or more hardware processors, the generated sensor data from the one or more sensors;
   analyzing, by the one or more hardware processors, the obtained sensor data using one or more artificial intelligence models to generate one or more controlled signals; and
   optimizing, by the one or more hardware processors, the one or more operational parameters using the one or more controlled signals and one or more predictive artificial intelligence models for:
      actuating a gas-sealed flap associated with at least one of: the one or more inlet vents and two or more outlet vents associated with the enclosure to regulate a flow of the atmospheric air into the enclosure and release at least one of the: adsorbed one or more component gases and processed atmospheric air from the enclosure.

14. The method of claim 13, wherein the method comprises:
   initiating, by the one or more hardware processors, a first airflow-controlling unit of the one or more airflow-controlling units associated with the one or more inlet vents to drive the atmospheric air from surroundings into the enclosure based on the one or more controlled signals; and
   initiating, by the one or more hardware processors, a second airflow-controlling unit of the one or more airflow-controlling units and a third airflow-controlling unit of the one or more airflow-controlling units associated with the two or more outlet vents to emit at least one of the: one or more component gases and processed atmospheric air, from the enclosure.

15. The method of claim 13, wherein the method comprises:
   closing, by the one or more hardware processors based on the one or more controlled signals, the gas-sealed flap associated with the one or more inlet vents to halt the flow of the atmospheric air into the enclosure to release the adsorbed one or more component gases based on inducing electrical current into the one or more adsorptive composites;
   opening, by the one or more hardware processors based on the one or more controlled signals, the gas-sealed flap associated with a first outlet vent of the two or more outlet vents to emit the adsorbed one or more component gases into diverse gas-storing cylinders; and
   opening, by the one or more hardware processors based on the one or more controlled signals, the gas-sealed flap associated with a second outlet vent of the two or more outlet vents to emit the processed atmospheric air from the enclosure.

16. The method of claim 13, wherein the one or more environmental conditions comprises at least one of a: temperature, pressure, humidity, and concentrations of the one or more component gases; and the one or more operational parameters comprises at least one of a: speed of the one or more airflow-controlling units, operational status of the gas-sealed flap, saturation level of the one or more adsorptive composites, and elapsed time for resetting the system.

17. The method of claim 13, wherein the one or more controlled signals comprises information related at least one of: adjusting the speed of the one or more airflow-controlling units, changing the operational status of the gas-sealed flap, initiating the release of the adsorbed one or more component gases, triggering one or more maintenance alerts for the one or more adsorptive composites, and scheduling the elapsed time for resetting the system.

18. The method of claim 13, wherein the method comprises:
   optimizing, by the one or more artificial intelligence models, the one or more operational parameters based on historical data,
   the one or more artificial intelligence models is a Recurrent Neural Network (RNN) model; and
   predicting, by the one or more predictive artificial intelligence models, one or more saturation rates of the one or more adsorptive composites to optimize the one or more operational parameters,
   the one or more predictive artificial intelligence models is a Reinforcement Learning (RL) model, wherein the Reinforcement Learning (RL) model comprises at least one of a: Deep Q-Network (DQN) and Policy Gradient method.

19. A non-transitory computer-readable storage medium having programmable instructions stored therein, that when executed by one or more hardware processors, cause the one or more hardware processors to:
   obtaining sensor data from one or more sensors associated with one or more segregation units,
   wherein each segregation unit of the one or more segregation units comprises an enclosure, the enclosure configured with one or more adsorptive composites to adsorb the one or more component gases from the atmospheric air as the atmospheric air interacts with the one or more adsorptive composites for emitting processed atmospheric air,
   wherein the processed atmospheric air is the atmospheric air free from the one or more component gases, and
   wherein the sensor data generated based on at least one of: one or more environmental conditions and one or more operational parameters of at least one of: the one or more adsorptive composites, one or more airflow-controlling units, and a gas-sealed flap operatively connected to at least one of: one or more inlet vents and two or more outlet vents of the enclosure;
   analyzing the obtained sensor data using one or more artificial intelligence models to generate one or more controlled signals; and
   optimizing the one or more operational parameters using the one or more controlled signals and one or more predictive artificial intelligence models for at least one of:
      actuating the gas-sealed flap associated with at least one of the: one or more inlet vents and two or more outlet vents associated with the enclosure to regulate a flow of the atmospheric air into the enclosure and release at least one of the: adsorbed one or more component gases and processed atmospheric air from the enclosure.

20. The non-transitory computer-readable storage of claim 19, further configured to cause the one or more hardware processors to:
   optimizing, by the one or more artificial intelligence models, the one or more operational parameters based on historical data,
   the one or more artificial intelligence models is a Recurrent Neural Network (RNN) model; and
   predicting, by the one or more predictive artificial intelligence models, one or more saturation rates of the one or more adsorptive composites to optimize the one or more operational parameters,
   the one or more predictive artificial intelligence models is a Reinforcement Learning (RL) model, wherein the Reinforcement Learning (RL) model comprises at least one of a: Deep Q-Network (DQN) and Policy Gradient method.

* * * * *